United States Patent [19]

Rieke

[11] Patent Number: 5,330,687
[45] Date of Patent: * Jul. 19, 1994

[54] PREPARATION OF FUNCTIONALIZED POLYMERS UTILIZING A SOLUBLE HIGHLY REACTIVE FORM OF CALCIUM

[75] Inventor: Reuben D. Rieke, Lincoln, Nebr.

[73] Assignee: Board of Regents of the University of Nebraska, Lincoln, Nebr.

[*] Notice: The portions of the term of this patent subsequent to May 18, 1993 has been disclaimed.

[21] Appl. No.: 923,749

[22] Filed: Jul. 30, 1992

Related U.S. Application Data

[63] Continuation-in-part of Ser. No. 739,294, Aug. 1, 1991, Pat. No. 5,211,886.

[51] Int. Cl.$^5$ .............................................. C07F 3/04
[52] U.S. Cl. .............................................. 260/665 R
[58] Field of Search .................................. 260/665 R

[56] References Cited

U.S. PATENT DOCUMENTS

| 3,501,332 | 3/1970 | Buckman | 117/47 |
| 4,830,903 | 3/1989 | Levy | 428/209 |
| 4,892,733 | 1/1990 | Bichon et al. | 424/422 |
| 4,963,264 | 10/1990 | Davis | 210/638 |
| 4,966,784 | 10/1990 | Tanaka et al. | 427/2 |
| 5,211,886 | 5/1993 | Rieke | 260/665 R |

FOREIGN PATENT DOCUMENTS

| 2027257 | 4/1991 | Canada . |
| 0311476 | 4/1989 | European Pat. Off. . |
| 423627A1 | 4/1991 | European Pat. Off. . |
| 1566343 | 3/1969 | France . |
| 2302319 | 9/1976 | France . |

OTHER PUBLICATIONS

R. A. O'Brien, "Chemical Modification of Halogenated Polystyrene Resins Utilizing Highly Reactive Copper and Calcium and the Chemistry of Highly Reactive Copper Contained in a Polymer", Ph.D. Thesis, The University of Nebraska–Lincoln (1992).
J. M. J. Frechet, "Synthesis and Applications of Organic Polymers as Supports and Protecting Groups", Tetrahedron, 37, 663 (1981).
P. K. Freeman et al., "Magnesium Antracene Dianion", J. Org. Chem., 48, 879 (1983).
T. M. Fyles et al., "The use of polymer supports in organic systhesis. V. The preparation of monoacetates of symmetrical diols", Can. J. Chem., 54, 935 (1976).
B. G. Gowenlock et al., "The Organometallic Chemistry of the Alkaline Earth Metals," J. Organomet. Chem. Library, Organomet. Chem. Rev., 3, 1 (1977).
R. H. Grubbs et al., "Hybrid-Phase Catalysts", Chemtech, 512 (Aug. 1977).
T. P. Hanusa, "New Developments in the Organometallic Chemistry of Calcium, Strontium and Barium", Polyhedron, 9, 1345 (1990).

S. Harvey et al., "Polymer Supported 'Magnesium(antracene)': Effective in Forming Benzylic Grignard Reagents (via Electron Transfer Reactions)", J. C. S., Chem. Commun., 652 (1988).
S. Harvey et al., "Main Group Conjugated Organic Anion Chemistry. 3. Application of Magnesium–Anthracene Compounds in the Synthesis of Grignard Reagents", J. Org. Chem., 53, 3134 (1988).
P. Hodge, "Reactions using Polymer-supported Organometallic Reagents", Polymer-Supported Reactions in Organic Synthesis, P. Hodge and D. C. Sherrington, eds., John Wiley and Sons, New York, pp. 146-150 (1980).
P. Hodge, "Organic Reactions using Polymer-supports Catalysts, Reagents or Substrates", Synthesis and Separations Using Functional Polymers, D. C. Sherrington and P. Hodge, eds., John Wiley and Sons, Ltd., New York, pp. 43-122 (1988).
S. Itsuno et al., "The First direct Formation of a Grignard Reagent on an Insoluble Polymer", J. Org. Chem., 52, 4644 (1987).

(List continued on next page.)

Primary Examiner—José G. Dees
Assistant Examiner—Porfirio Nazario
Attorney, Agent, or Firm—Merchant, Gould, Smith, Edell, Welter & Schmidt

[57] ABSTRACT

Calcium-substituted polymeric reagents are provided. These reagents can be prepared via the oxidative addition of a soluble highly reactive calcium species to organic and inorganic polymers containing alkyl, aryl, or alkylaryl pendent groups substituted with halide atoms, cyanide molecules, 1,3-dienes, or any conjugated polyunsaturated system. Preferably, the polymer is a cross-linked p-bromopolystyrene, p-chloropolystyrene, p-fluoropolystyrene, or chloromethylated polystyrene. Preferably, the soluble highly reactive calcium species is prepared from the reduction of Ca(II) salts with an alkali metal arene, such as lithium biphenylide. These calcium-substituted polymeric reagents react with a variety of electrophiles to yield functionalized polymers. Reaction with Cu(I) salts yields calcium-substituted polymeric cuprate reagents, which can react, for example, with acid chlorides to form ketones, alkyl halides containing functionality, and undergo 1,4-conjugate addition with $\alpha,\beta$-unsaturated ketones, aldehydes, esters, and amides. Bifunctionalization of the polymer can be achieved by the addition of highly reactive calcium to a functionalized polymer containing a halogen. Polymers can be cross-coupled with dyes, UV stabilizers, biologically active substrates, molecules that impart specifically desired characteristics, among other desirable functional groups.

20 Claims, No Drawings

OTHER PUBLICATIONS

S. Itsuno et al., "Preparation and Applications of Novel Reactive Polymers Containing Organometallic Species", *J. Polm. Mater. Sci. Eng.*, 57, 570 (1987).

B. Jepson et al., "Chromatographic Separation of Calcium Isotopes with Polymer-Bound Ligands", *Separation Sci. and Tech.*, 25, 1893 (1990).

P. Knochel et al., "Synthesis and Reactivity toward Acyl Chorides and Enones of the New Highly Functionalized Copper Reagents RCu(CN)ZnI", *J. Org. Chem.*, 53, 2390 (1988).

P. Lecavalier et al., "Polymer-Assisted Asymmetric Reactions. III. The use of Crosslinked Polymers Containing Chiral Amino-Alcohol or Polyol Pendant Groups in Asymmetric Hydride Reductions", *React. Polm.*, 3, 315 (1985).

R. L. Letsinger et al., "Reactions on Polymer Supports", *J. Am. Chem. Soc.*, 86, 5163 (1964).

C. C. Leznoff, "The Use of Insoluble Polymer Supports in Organic Chemical Synthesis", *Chem. Soc. Rev.*, 3, 65 (1974).

J. Lieto et al., "Polymeric Supports for Catalysts", *Chemtech*, 46 (Jan. 1983).

W. E. Lindsell, "Magnesium, Calcium, Strontium and Barium" *Comprehensive Organometallic Chemistry*, Ch. 4.1 and 4.2; Wilkinson, Stone & Abel, ed.; Pergamon Press, Oxford (1982).

B. H. Lipshutz, "The Chemistry of Higher Order Organocuprates", *Tetrahedron*, 40, 5005 (1984).

B. H. Lipshutz, "Reactions of Stoichiometric Higher Order, Mixed Lithio Magnesio Organocuprates", *Tetrahedron*, 42, 2873 (1986).

B. H. Lipshutz, "Applications of Higher-Order Mixed Organocuprates to Organic Synthesis", *Synthesis*, 325 (1987).

P. Markov et al., "Reactions of Calcium and Magnesium Naphthalenides with Ethyl Esters of 2-Bromopropionic and 2-Bromobutyric Acid in Liquid Ammonia," *J. Organomet. Chem.*, 81, 1 (1974).

M. J. McCormick et al., "Preparation of Activated Calcium, Strontium, and Barium Powders by Reduction of Alkaline Earth Di-iodides", *J.C.S., Chem. Commum.*, 778 (1990).

L. R. Melby et al., "Oligonucleotide Syntheses on Insoluble Polymer Supports. I. Stepwise Synthesis of Trithymidine Diphosphate", *J. Am. Chem. Soc.*, 89, 450 (1967).

R. B. Merrifield, "Solid Phase Peptide Synthesis. I. The Synthesis of a Tetrapeptide", *J. Am. Chem. Soc.*, 85, 2149 (1963).

M. Metelko et al., "Site-Site Interactions in a Polymer Matrix. Functionalization of Chloromethylated Crosslinked Poly-Styrene with Alkyl and Aryl Substituted Amines", *Synth. Commun.*, 18, 1821 (1988).

Z. M. Michalska et al., "Supported homogeneous catalysts", *Chemtech*, 117, (Feb. 1975).

D. C. Neckers, "Solid Phase Synthesis", *J. Chem. Ed.*, 52, 695 (1975).

J. F. Normant, "Organocopper(I) Compounds and Organocuprates in Synthesis", *Synthesis*, 63 (Feb. 1972).

J. F. Normant, "Stoichiometric Versus Catalytic Use of Copper(I) Salts in the Synthetic Use of Main Group Organometallics", *Pure and Appl. Chem.*, 50, 709 (1978).

R. A. O'Brien et al., "Direct Metalation of p-Bromopolystyrene Using Highly Reactive Copper and Preparation and Reaction of Highly Reactive Copper Bound to an Insoluble Polymer," *J. Org. Chem.*, 55, 788 (1990).

G. H. Osborne, "Insoluble Substances", *Synthetic Ion-Exchangers;* The Macmillan Co.: New York, 1956, pp. 32-33.

A. Patchornik et al., "Reactive Species Mutually Isolated on Insoluble Polymeric Carriers. I. The Directed Monacylation of Esters", *J. Am. Chem. Soc.*, 92, 7587 (1970).

C. U. Pittman, Jr. et al., "Polymer-Bound Catalysts and Reagents", *Chemtech*, 560 (Sep. 1973).

G. H. Posner, "Conjugate Addition Reactions of Organiocopper Reagents", *Org. Reactions* (N.Y.), 19, 1 (1972).

G. H. Posner, "Substitution Reactions Using Organocopper Reagents", *Org. Reactions* (N.Y.), 22, 253 (1975).

C. L. Raston et al., "Magnesium Anthracene: An Alternative to Magnesium in the High Yield Synthesis of Grignard Reagents", *J. C. S., Chem. Commun.*, 1702 (1984).

R. D. Rieke et al., "Activated Metals. I. Preparation of Highly Reactive Magnesium Metal," *J. Am. Chem. Soc.*, 94, 7178 (1972).

R. D. Rieke et al., "Activated Metals. The Effect of Added Metal Salts on Magnesium Reactivity," *J. Am. Chem. Soc.*, 96, 1775 (1974).

R. D. Rieke et al., "Preparation of Highly Reactive Metal Powders: Some of Their Uses in Organic and Organometallic Synthesis", *ACS Symposium Series*, 333, 223 (1987).

R. D. Rieke et al., "Direct Formation and Reaction of Functionalized Thienyl-Based Organocopper Reagents", *Synth. Commun.*, 19, 1833 (1989).

R. D. Rieke, "Preparation of Organometallic Compounds from Highly Reactive Metal Powders", *Science*, 246, 1260 (1989).

R. D. Rieke et al., "Chemistry of Substituted (2-Butene-1,4-diyl)magnesium: A Facile Approach to Complex Carbocycles, Functionalized Ketones and Alcohols, and Silicon-Containing Heterocycles," *J. Org. Chem.*, 56, 3109 (1991).

K. Soai et al., "Enantioselective Addition of Dialkylzincs to Aldehydes Using Heterogeneous Chiral Catalysts Immobilized on Alumina and Silica Gel", *J. Org. Chem.* 55, 4832 (1990).

D. E. Stack et al., "Direct Formation of Functionalized and Allylic Organocopper Reagents Derived from a Cuprous Cyanide-Lithium Bromide Complex", *J. Am. Chem. Soc.*, 113, 4672 (1991).

R. M. Wehmeyer et al., "Direct Formation of Functionalized Ketones via the Coupling of Functionalized Organocopper Reagents with Acid Chlorides", *Tetrahedron Lett.*, 29, 4513 (1988).

T.-C. Wu et al., "Direct Formation of Epoxyalkylcopper Reagents from Activated Copper and Epoxyalkyl Bromides and Their Intramolecular Cyclizations", *Tetrahedron Lett.*, 29, 6753 (1988).

T. -C. Wu et al., "Highly Reactive Copper- and Nickel-Mediated Coupling of Aroyl Chlorides", *J. Org. Chem.*, 53, 2381 (1988).

T. -C. Wu et al., "Organocalcium Chemistry: Preparation and Reactions of Highly Reactive Calcium," *J. Org. Chem.*, 55, 5045 (1990).

OTHER PUBLICATIONS

H. Xiong et al., "Facile Formation of Substituted 2-Butene-1,4-diylmagnesium Using Highly Reactive Magnesium: A Simple Approach to Complex Carbocycles and Functionalized Ketones", *J. Org. Chem.*, 54, 3247 (1989).

S. H. Yu et al., "Preparation of Alkylmagnesium Fluorides", *J. Org. Chem.*, 36, 2123 (1971).

L. Zhu et al, "The Direct Formation of Functionalized Alkyl(Aryl)zinc Halides by Oxidative Addition of Highly Reactive Zinc with Organic Halides and Their Reactions with Acid Chlorides, A, -Unsaturated Ketones, and Allylic, Aryl, and Vinyl Halides", *J. Org. Chem.*, 56, 1445 (1991).

R. A. O'Brien et al., "Phosphorous-31 NMR Studies of Polymer 4 Supported Highly Reactive Copper Reagents", *Magnetic Resonance in Chemistry*, 30, 398–402 (1992).

R. D. Rieke, "Preparation of Highly Reactive Powders/Surfaces and Their Use in the Preparation of Organometallic Compounds," *Crit. Rev. Surf. Chem.*, 1, 131–166 (1991).

D. E. Stack et al., "Direct Formation of Highly Functionalized Allylic Organocopper Reagents from Allylic Chlorides and Acetates", *J. Am. Chem. Soc.*, 114, 5110–5116 (1992).

D. E. Stack et al., "Formation of a New Bis-Organocopper Reagent from the Reaction of 2,3-Dichloropropene and Highly Active Zero Valent Copper Derived from a CuCN.2LiCl Complex", *Tetrahedron Letters*, 33, 6575–6578 (1992).

A. Akelah et al., *Chem. Rev.*, 81, 557 (1981).
L. C. Anand et al., *Macromol. Syn.*, 4, 9 (1972).
S. C. Berk et al., *J. Org. Chem.*, 53, 5789 (1988).
B. Bogdanovic, *Acc. Chem. Res.*, 21, 261 (1988).
D. Braun, *Makromol. Chem.*, 30, 85 (1959).
B. Brix et al., *J. Org. Chem.*, 53, 3365 (1988).
T. P. Burns et al., *J. Org. Chem.*, 52, 3674 (1987).
F. Camps et al., *Tetrahedron Lett.*, 20, 1713 (1971).
J. Chalk, *Polymer Lett.*, 6, 649 (1968).
J. P. Collman et al., *Principles and Applications of Organotransition Metal Chemistry;* University Science Books: Mill Valley, Calif.; pp. 682–738 (1987).
G. Corfield et al., *Org. Coat. Appl. Poly.Sci. Proc.*, 46, 445 (1981).
G. D. Darling et al., *J. Org. Chem.*, 51, 2270 (1986).
G. W. Ebert et al., *J. Org. Chem.*, 49, 5280 (1984).
G. W. Ebert et al., *J. Org. Chem.*, 53, 4482 (9188).
A. T. Ellis et al., Anal. Proc., 17, 48 (1980).
D. C. Evans et al., *J. Polm. Sci., Polm. Chem. Ed.*, 12, 247 (1974).
M. J. Farrall et al., *J. Org. Chem.*, 41, 3877 (1976).
M. J. Farrall et al., *Nouv. J. Chim.*, 7, 449 (1983).
J. M. J. Frechet et al., *Proc. ACS Symp., 1976*, S. S. Labana, ed., Academic Press, p. 59 (1977).
P. Markov et al., *Monatshefte fur Chemie*, 107, 619 (1976).
R. A. O'Brien et al., *J. Inorg. and Organomet. Poly.*, 2, 345 (1992).
R. A. O'Brien et al., *J. Org. Chem.*, 57, 2667 (1992).
R. D. Rieke, Abstract of National Institute of Health Grant No. GM35153 (1992).

PREPARATION OF FUNCTIONALIZED POLYMERS UTILIZING A SOLUBLE HIGHLY REACTIVE FORM OF CALCIUM

GOVERNMENT SUPPORT

The present invention was made with government support under Grant No. GM35153 awarded by the National Institute of Health. The Government has certain rights in this invention.

CROSS REFERENCE TO RELATED APPLICATION

This application is a continuation-in-part of application Ser. No. 07/739,294, filed Aug. 1, 1991 which issued as U.S. Pat. No. 5,211,886 on May 18, 1993.

BACKGROUND OF THE INVENTION

Polymers permeate every aspect of today's society. Moreover, advances in our society are keenly tied to advances in new materials, particularly polymers. Unfortunately, however, we are limited in the types of polymers that can be prepared. For example, polymers containing a wide variety of desirable functional groups can not be prepared, or if they can be prepared, it is only with great difficulty. Thus, using presently known techniques it is generally difficult to modify polymers. For example, it is typically difficult to modify the surfaces of polymers to attach dyes, UV stabilizers, or molecules that impart conducting properties, magnetic properties, nonlinear optical properties, etc.

Furthermore, insoluble polymers, such as cross-linked polystyrene resins and functionalized polystyrene resins, are highly desirable reagents in organic synthesis. For example, insoluble polymers are important reagents in organic synthesis as protecting groups and in asymmetric syntheses as chiral auxiliaries. They are also important reagents in solid-phase synthesis, and as supports for chromatography and catalysis.

Methods for chemically modifying polymers, i.e., functionalizing, polymers, such as cross-linked polystyrene resins, typically involve: (1) lithiation of p-bromopolystyrene; (2) lithiation of polystyrene; and (3) nucleophilic substitution on chloromethylated polystyrene. These transformations of insoluble polymers normally occur with a soluble reagent interacting in intimate fashion with an insoluble polymer. This occurs, for example, in the preparation of lithium and potassium derivatives of chloromethylated polystyrene. Furthermore, insoluble Grignard reagents have been prepared in THF from the addition of a soluble magnesium anthracene to lightly cross-linked polymers containing chloromethyl groups and alkyl/aryl bromides. These reagents, however, have limited applicability.

The use of functionalized polymers in organic chemistry, particularly those containing metal atoms, has been slowed by the insoluble form in which most metals are typically found. Thus, there are relatively few effective techniques available to prepare functionalized polymers, particularly containing metal atoms.

An object of this invention is to generate novel functionalized polymers, both soluble and insoluble, that may not be available using standard polymerization techniques. Furthermore, an object of this invention is to develop a method for modifying the surfaces of soluble and insoluble polymers to attach dyes, UV stabilizers, drug systems, biologically active substrates, molecules that impart conducting properties, magnetic properties, nonlinear optical properties, adhesive properties, thermal stability, or increased strength. Another object of this invention is to produce a wide variety of calcium-substituted polymeric reagents that can be used to produce new organic compounds, new functionalized polymers, and new, more direct methods of synthesis. Yet another object of this invention is to produce a wide variety of calcium-substituted polymeric reagents that can be used to produce novel polymers, which upon cleavage can be used to synthesize novel monomers and organic products.

SUMMARY OF THE INVENTION

These and other objects are achieved by the present invention, which is directed to the use of a soluble highly reactive calcium species to form calcium-substituted polymeric reagents, which can be either substantially organic polymers or substantially inorganic polymers. As used herein, the phrase "highly reactive" refers to the reactivity of the calcium species in organic reactions, particularly oxidative addition reactions. A calcium species is highly reactive if it reacts with a wide variety of primary, secondary, and particularly tertiary alkyl halides in relatively high yields, for example in greater than about 50% yields, preferably in greater than about 70% yields.

A polymer that is "substantially" organic is one in which the main polymer backbone, or internal support structure, is composed of organic repeating structural units. A polymer that is "substantially" inorganic is one in which the main polymer backbone, or internal support structure, is composed of inorganic repeating structural units.

The polymers useful in the compounds and methods of the present invention can be soluble or insoluble, preferably they are insoluble. They can be in the form of beads, pellets, films, blocks, or powders, without limitation. They can be solvent swellable, macroreticular, or popcorn polymers, without limitation. They can be noncross-linked, i.e., linear, lightly cross-linked, or highly cross-linked. They can be organic polymers of any of a variety of monomers, such as styrene, butadiene, divinylbenzene, vinyl chloride, etc. They can be inorganic polymers, such as alumina or silica. Preferably, the polymers are insoluble organic polymers. More preferably, they are insoluble olefinic-based polymers, i.e., polymers made from olefinic monomers. Most preferably they are insoluble polystyrene-based polymers.

According to the invention, the polymers contain groups that react with the soluble zerovalent calcium species irrespective of whether the polymers are substantially inorganic or substantially organic. These reactive groups can be within, or attached directly to, the polymer backbone or support structure, or they can be within or attached to groups pendant to the main polymer backbone. The reactive groups include organic or other groups preferably substituted with halogen, cyanide, 1,3-dienes, or conjugated polyunsaturated hydrocarbon systems.

The soluble highly reactive zerovalent calcium species used to prepare the calcium-substituted polymeric reagents of the present invention is composed of formally zerovalent calcium metal atoms in combination or complexation with a solubilizing agent in an ethereal, polyethereal, or hydrocarbon solvent. The solubilizing agent can be any of a variety of macrocyclic polyethers, cryptates, or polyenes capable of interacting with the formally zerovalent calcium metal atoms in such a manner that a less reactive finely divided powder does not substantially precipitate out of solution. Preferably, the solubilizing agent is a polyene. More preferably, the solubilizing agent is an aromatic polyene, i.e., an arene or polyarylene, such as an aromatic electron-transfer compound. Examples of aromatic electron-transfer compounds include biphenyl, naphthalene, and anthracene. The soluble activated calcium species can also be in combination with an alkali metal salt.

An alternative form of highly reactive zerovalent calcium can also be used to prepare calcium-substituted organic reagents, including the calcium-substituted polymeric reagents of the present invention. This alternative form is a polymer-bound biphenyl complex of a highly reactive zerovalent calcium species in which the highly reactive zerovalent calcium is in combination or complexation with an insoluble polymer-bound biphenyl group.

The calcium-substituted polymeric reagents are in their most general sense polymers containing calcium atoms, either within, or attached directly to, the backbone of the polymer or within, or attached to, groups pendant therefrom. Preferably the polymers contain aliphatic, aryl, arylalkyl, or heterocyclic pendant groups substituted with calcium. The calcium-substituted polymeric reagents can also have pendant aliphatic, aryl, arylalkyl, or heterocyclic groups substituted with halogen, cyanide, 1,3-diene, or conjugated polyunsaturated groups that did not react with the highly reactive calcium species, as well as groups unreactive to the highly reactive calcium species. Thus the calcium-substituted polymeric reagent of the present invention can include a polymer containing reactive halogen, cyanide, 1,3-diene, or conjugated polyunsaturated groups; and at least one of these reactive groups further substituted with, or replaced by, a calcium atom.

The calcium-substituted polymeric reagents undergo subsequent reaction with a variety of electrophiles to form functionalized polymers. They also undergo reactions with a variety of Cu(I) or Cu(II) salts to yield calcium-substituted polymeric cuprate reagents. These reagents, which consist of a polymer in combination or complexation with calcium and copper atoms, in turn can be used to carry out a number of useful transformations on the polymer. Significantly, methods and reagents of the present invention can be used to introduce a second functional group into a polymer which contains a halogen as well as another functional group.

In the context of this invention, the term "aliphatic" means a saturated or unsaturated linear, branched, or cyclic hydrocarbon radical. The term "alkyl" means a saturated linear, branched, or cyclic hydrocarbon radical. The term "heterocyclic" means a mono- or polynuclear saturated or unsaturated cyclic radical containing carbons and one or more heteroatoms such as nitrogen, oxygen, or sulfur or a combination thereof in the ring or rings. This includes, but is not limited to pyridine, pyrrole, indole, thiazole, pyrazine, guanine, cytosine, thymine, adenine, uredine, uracil, oxazole, pyrazole, hydantoin, piperazine, quinoline, xanthene, 1,10-phenanthroline, and acridine. The term "aryl" means a mono- or polynuclear aromatic hydrocarbon radical. The term "arylalkyl" means a linear, branched, or cyclic alkyl hydrocarbon radical having a mono- or polynuclear aromatic hydrocarbon or heterocyclic substituent.

The term "polymeric" or "polymer" is used herein in its most general sense to mean a compound consisting essentially of repeating structural units. It refers to inorganic polymers such as silica and alumina. It also refers to organic polymers such as polyolefins, polystyrenes, polyesters, polyurethanes, polyamides, polycarbonates, polyethers, etc.

DETAILED DESCRIPTION OF THE INVENTION

The present invention is based upon the discovery that a soluble highly reactive calcium metal species displays surprising and unexpected reactivity and usefulness in the functionalization and modification of polymers, particularly the surfaces of insoluble polymers. The soluble highly reactive calcium species displays surprising and unexpected reactivity toward a wide variety of polymers. These polymers include organic and inorganic polymers containing reactive groups such as halide atoms, cyanide molecules, 1,3-dienes, or any conjugated polyunsaturated system. By using the interaction between the highly reactive calcium species of the present invention and the reactive groups either within the polymer backbone or pendant thereto, new polymers can be produced. For example, known polymers, particularly the surfaces of known soluble and insoluble polymers, can be modified to attach dyes, UV stabilizers, indicators, drug systems, biologically active substrates, and molecules that impart conducting properties, magnetic properties, nonlinear optical properties, adhesive properties, thermal stability, or increased strength.

The Polymers

The polymers that can be functionalized, or modified especially with respect to their surface characteristics, by the methods of the present invention can be soluble or insoluble. They can be in the form of beads, powders, pellets, films, or blocks, without limitation. They can be solvent swellable, macroreticular, or popcorn polymers, without limitation. They can be noncrosslinked, i.e., linear, lightly cross-linked, i.e., with about 1–3% cross-linking, or highly cross-linked, i.e., with about 15–20% cross-linking.

The polymers that can be functionalized, or modified especially with respect to their surface characteristics, by the methods of the present invention can be substantially organic or substantially inorganic. They can be organic polymers prepared from monomers of styrene, butadiene, divinylbenzene, vinyl chloride, tetrafluoroethylene, and the like. They can be inorganic polymers, i.e., solid supports based on alumina, silica, clay, zeolites, glass, and the like.

In general, any of a variety of soluble or insoluble polymer materials, whether substantially organic or inorganic based, containing a group reactive with the soluble calcium species can be functionalized by the methods of the present invention. These groups reactive with the soluble calcium species of the present invention include halide atoms, cyanide molecules, 1,3-dienes, or any conjugated polyunsaturated system. These groups can be within, i.e., attached directly to, the polymer backbone, such as in a polyvinylchloride polymer or a polytetrafluorethylene polymer. They can also be within or attached to organic groups pendant to the polymer backbone, such as in a polystyrene polymer. Preferably, these reactive groups are within, or attached to, aliphatic, heterocyclic, aryl, or arylalkyl groups pendant to the polymer backbone. These reactive groups are within, or attached to, groups pendant to the polymer backbone through a covalent interaction.

If an inorganic support, such as alumina or silica, is used, the surface can be treated with reagents such as $ClCH_2CH_2CH_2Si(OEt)_3$, for example, to form an alkyl chloride attached to the surface. The remainder of the Si—OH groups can be protected prior to reaction of the alkyl chloride with the zerovalent highly reactive calcium followed by an electrophile. Subsequent to the reaction with an electrophile, the protecting group can be removed.

Preferably, the polymers useful in the reagents and methods of the present invention are insoluble organic polymers having pendent organic groups substituted with halogen, cyanide, 1,3-dienes, or conjugated polyunsaturated groups. More preferably they are insoluble olefinic-based polymers having aliphatic, aryl, arylalkyl, or heterocyclic pendant groups substituted with halogen, cyanide, 1,3-dienes, or conjugated polyunsaturated groups. Most preferably, the olefinic-based polymers, i.e., polymers made from olefinic monomers, are polystyrene resins containing halide moieties or $C_{1-6}$ haloalkyl moieties. Of the $C_{1-6}$ haloalkyl and halide moieties, the preferred groups include chloromethyl, fluoromethyl, bromomethyl, bromine, chlorine, iodine, and fluorine moieties. The most preferred groups include chloromethyl, bromine, chlorine, and fluorine.

The polymers can be characterized by the number of reactive groups within the polymer, i.e., either within the polymer backbone or within a group pendant thereto. This characterization can be reported as the degree of substitution, degree of functionality, or degree of functionalization. Similarly, these values can be used to characterize the modified, i.e., functionalized, polymer with respect to the desired functionality.

The degree of substitution of the desired polymer starting materials with, for example, halide groups is preferably within a range of about 1-98 halide atoms attached per 100 aromatic or pendant chains (0.5-8.0 mmoles halide atoms per gram polymer). More preferably, the degree of substitution is within a range of about 1-15 halide atoms attached per 100 aromatic or pendant chains (0.5-1.5 mmoles halide atoms per gram polymer), and most preferably about 1-6 halide atoms attached per 100 aromatic or pendant chains (0.5-1.0 mmoles halide atoms per gram polymer).

The degree of functionality (DF), i.e., the degree of functionalization (DF), of polystyrene polymers, for example, represent the fraction of aromatic rings that possess the desired functionalities. The desired polymer starting materials possess a DF within a range of about 0.01-1.0, more preferably within a range of about 0.10-0.25, and most preferably within a range of about 0.10-0.15. This is simply another means by which the degree of substitution of the polymers, whether the desired polymer starting materials or the resultant modified or functionalized polymers, can be characterized.

Polystyrene, a preferred organic polymer, is a high molecular weight linear polymer represented by the formula

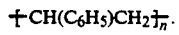

The commercially useful form of polystyrene is amorphous and highly transparent. It is stiff and clear at room temperature, and a viscous liquid above its glass-transition temperature. The basic polymer backbone is chemically inert. Styrene can be copolymerized with a variety of other monomers, including butadiene, methyl methacrylate, methacroyl acetone, divinylbenzene, and the like, to effect its characteristics. Divinylbenzene copolymers with styrene are typically used as supports for the active sites in ion exchange resins.

Polystyrene is available in a wide variety of cross-link densities, surface areas, and porosities. The polystyrene resins useful in the present invention are preferably lightly cross-linked polystyrene/divinylbenzene resins. By cross-linking, it is meant that the polymer chains are interconnected by means of a $—(CH_2CH_2)—$ group attached to the aryl ring system. The degree of cross-linking is preferably within a range of about 1-3%, more preferably within a range of about 1-2%, and most preferably at about 1%. For polystyrene/divinylbenzene, this value is given in terms of "DVB," i.e., the amount of divinylbenzene. The degree of cross-linking effects the solubility of the polymers. The more highly cross-linked, the more insoluble the polymer is in most solvents.

The polymers, particularly insoluble polymers, can swell in certain solvents to expose or open reactive sites or make these sites available for reaction with the reactive zerovalent calcium species. Each polymer can swell to a different extent depending on the solvent used. This interaction between polymers and solvents is generally well known to those skilled in the art of polymer chemistry and depends on the polarity of the solvent, structure of the polymer, etc. This interaction can be used to modify the amount of functionalization, or modification, that occurs by the methods of the present invention. For example, in benzene, toluene, and THF, 1% cross-linked polystyrene resin is fully swollen and allows easy penetration of the zerovalent calcium species. In cyclohexane, however, the resin is only partially swollen. For partially swollen polymers, there are a number or reactive sites located in pores that are inaccessible to the zerovalent calcium species. Thus, the degree of modification of polymers, particularly insoluble polymers, can be effected by the proper choice of solvent system. That is, the extent to which just the surface of a polymer, or more of the main polymer matrix or bulk of the polymer can be modified is, to some extent, dependent on the solvent chosen for the reaction.

The physical form of the polymer also effects the extent to which the polymer can be functionalized. For example, polymer powders are readily penetrated by solvents and can be functionalized to a significant extent throughout the main polymer matrix. Large block polymers are not so easily penetrated. Thus, the degree of functionalization will be substantially concentrated on the surface of the polymer, rather than throughout the main polymer matrix or bulk of the polymer.

The extent to which a polymer is cured can also effect the degree of functionalization. For example, a thermoset polymer can be derivatized by the methods of the present invention before it is cured and while it is still flexible. It can then be cured to form a highly derivatized polymer, both on the surface and within the main polymer matrix or bulk of the polymer.

Also envisioned to be within the scope of the present invention are methods whereby a polymer can be functionalized by the soluble highly reactive calcium and then cleaved to get functionalized monomers. Furthermore, the extent of cross-linking within a polymer can be increased by using the soluble highly reactive calcium species.

The Soluble Highly Reactive Calcium Species

Soluble highly reactive calcium can be added to a polymer, and particularly to an olefinic-based polymer substituted with halogen, cyanide, 1,3-dienes, or conjugated polyunsaturated groups to form calcium-substituted polymeric reagents. The calcium-substituted polymeric reagents, i.e., calcium-substituted polymers, can be either soluble or insoluble; preferably they are insoluble. They can undergo a variety of reactions with organic electrophiles to produce both novel functionalized polymers and novel synthetic methods for new and known organic compounds under relatively mild reaction conditions.

The soluble highly reactive calcium species used to prepare the calcium-substituted polymeric reagents of the present invention is composed of formally zerovalent calcium metal atoms in combination or complexation with a solubilizing agent. By "in combination or complexation" in this context it is meant that calcium atom is bonded to the pi cloud of the aromatic solubilizing agent. This bond is formally a pi bond rather than the traditional sigma bond found in species such as an alkyl Grignard reagent. By "formally zerovalent" it is meant that the formal oxidation state, or charge, is equal to the group number (i.e., 2) minus the number of unshared electrons (i.e., 2) minus the number of bonds (i.e., 0). Although the formal oxidation state of the calcium metal in the preferred highly reactive calcium species is considered to be zero, it is believed that there is significant charge transfer between the calcium and the solubilizing agent.

The solubilizing agent that is in combination or complexation with the formally zerovalent calcium species preferably comes from a corresponding solubilized reducing agent that is capable of reducing Ca(II) salts in an ethereal, polyethereal, or hydrocarbon solvent. The solubilizing agent can be any of a variety of macrocyclic polyethers, crown ethers, cryptates, polyenes, and the like, capable of interacting with the formally zerovalent calcium metal atoms in such a manner that a less reactive finely divided powder does not precipitate out of solution to any significant extent. By this it is meant that the formally zerovalent calcium species of the present invention is substantially completely soluble in an ethereal, polyethereal, or hydrocarbon solvent with only about 20% or less of the calcium species in a solid state, i.e., in which there is no significant interaction with the solubilizing agent.

Preferably, the solubilizing agent is a polyene. More preferably, the solubilizing agent is an aromatic polyene, i.e., an arene or polyarylene, such as an aromatic electron-transfer compound. Examples of aromatic electron-transfer compounds include, but are not limited to, biphenyl, naphthalene, and anthracene. Compounds such as these are typically capable of transferring electrons in an oxidation reduction reaction through the formation of radical anions.

Thus, in a preferred embodiment, the highly reactive calcium species of the present invention is composed of zerovalent calcium metal atoms in combination or complexation with one or more of the arenes naphthalene, anthracene, or biphenyl. More preferably, the highly reactive calcium species of the present invention is composed of zerovalent calcium metal atoms in combination or complexation with the arene biphenyl.

The highly reactive calcium species of the present invention, whether in a mixture or complex, is soluble in ethereal, polyethereal, or hydrocarbon solvents. These include, but are not limited to, ethyl ether, tetrahydrofuran, glyme, diglyme, triglyme, benzene, and the like. If a hydrocarbon solvent is used, it preferably contains a secondary solubilizing agent such as N,N,N',N'-tetramethylethylenediamine, or other diamine or bidentate ligand capable of solubilizing the starting materials and product, particularly the starting materials. Preferably, the highly reactive calcium species is soluble in an ethereal or polyethereal solvent. More preferably, it is soluble in tetrahydrofuran (THF).

The soluble highly reactive calcium species can also be in combination with an alkali metal salt wherein the anion does not contain an acidic proton. The alkali metal of the salt can be Li, Na, K, Rb, or Cs. Preferably, it is Li, Na, or K, and most preferably it is Li. The anion can be, but is not limited to, a nitrate, nitrite, sulfate, cyanide, or halide. Preferably, the anion is a halide or cyanide. More preferably, the anion is a halide, and most preferably the anion is bromide or iodide.

The most specific and preferred embodiment of the soluble highly reactive calcium species of the present invention is composed of zerovalent calcium metal atoms in combination with, or complexed with, biphenyl and a lithium halide. The solvent used to solubilize the most preferred embodiment of the calcium species is tetrahydrofuran (THF).

The soluble highly reactive calcium species of the present invention is prepared from the reduction of a calcium(II) salt, the counterion of which can be any of a variety of anions that does not contain an acidic proton. For example, the anion can be a sulfate, nitrate, nitrite, cyanide, or halide. Preferably, the anion is a cyanide or a halide. More preferably, the anion is F, Cl, Br, or I. Most preferably the anion of the Ca(II) salt is Br or I.

Generally, the reducing agent can be any solubilized reducing reagent that is capable of reducing Ca(II) salts in an ethereal, polyethereal, or hydrocarbon solvent. Any reducing agent having a reduction potential of about −1.5 volts or more negative will satisfy this relation. It is preferred, however, if the reducing agent has a reduction potential of about −1.8 volts or more negative, and most preferred if the reducing agent has a reduction potential of about −2.0 volts or more negative. These values are relative to a Standard Calomel Electrode (SCE).

Examples of suitable solubilized reducing agents include alkali metal salts of aromatic anions, such salts being, for instance, sodium naphthalenide, lithium naphthalenide, sodium anthracenide, lithium anthracenide, sodium biphenylide, or lithium biphenylide; alkali metal-polyether solyates; alkali metal-crown ether solyates; alkali metal-cryptate solyates, and the like. Preferably, the reducing agent is an alkali metal arene salt. More preferably, the reducing agent is a combination of an alkali metal cation and an anion of an aromatic electron transfer compound, such as biphenyl, anthracene, or naphthalene. Most preferably, the reducing agent is preformed. Of the preformed alkali metal arene salts, the most preferred is lithium biphenylide.

By "preformed" it is meant that the alkali metal and about 1-1.2 equivalents of the arene, i.e., about 1-1.2 moles, are allowed to react substantially completely, i.e., until substantially all the alkali metal is consumed, before contacting any calcium salts. The formation of the preformed reducing agent typically takes place in an ethereal, polyetheral, or hydrocarbon solvent, and generally is substantially complete in about 2 hours.

Because the soluble highly reactive calcium species is preferably utilized within a short period of time after its preparation, it can also contain the alkali metal salt produced from the cation of the reducing agent and the anion of the calcium salt starting material. Generally, the alkali metal salt is not believed to effect the reactivity of the highly reactive calcium; however, it may facilitate the reactivity, particularly the oxidative addition reactions, of the polymeric organic halides with the highly reactive calcium.

The process for reduction to produce the soluble highly reactive calcium species is conducted under conditions designed to prevent its reoxidation and substantial precipitation as calcium powder. Generally, these conditions include use of ethereal, polyethereal, or hydrocarbon solvents and the exclusion of oxygen. Also, the conditions are controlled so as to promote the existence of the calcium atoms as small soluble clusters and to avoid their agglomeration into larger configurations that could precipitate out of solution. Larger clusters of metal atoms generally means lower solubility and lower reactivity.

Preferably, these conditions include temperatures of about 100° C. or less, an inert atmosphere, e.g., an argon or nitrogen atmosphere, a reaction time of about 1 hour, and an ether or polyether solvent such as diethyl ether, dimethyl ether, tetrahydrofuran and the like, or a hydrocarbon solvent. The Ca(II) salt can be soluble in the solvent of the reaction, or it can be a suspension therein. The Ca(II) salt is preferably soluble in the solvent at room temperature, as is the resultant soluble highly reactive calcium species. The reduction can as well be conducted in a hydrocarbon solvent with N,N,N',N'-tetramethylethylenediamine (TMEDA) to solubilize or disperse the starting material complex and reducing agent. Typically, the molar ratio of the reducing agent to the Ca(II) salt is about 2:1 for an equivalent amount; however, the Ca(II) salt can be in excess. Preferably, the Ca(II) salt is present in an amount of about 1.1-2.0 equivalents, and more preferably in an amount of about 1.5-2.0 equivalents, per equivalent of reducing agent. Excess Ca(II) salt is used to ensure that there is little or no reducing agent present during subsequent reactions, particularly if the highly reactive calcium is used in the subsequent reactions without previous isolation.

Although the zerovalent calcium species can be maintained for a time under these conditions, it is also quite reactive. Consequently, it is preferably synthesized and used immediately or within a very short period of time. However, it can be stored for several days and much longer at lower temperatures under an inert atmosphere.

The Calcium-Substituted and Calcium-Cuprate Polymeric Reagents and Reactions Thereof The soluble highly reactive calcium species described above undergoes reaction with soluble and insoluble organic and inorganic polymers. These polymers contain groups reactive with the soluble calcium species. Preferably, these polymers contain reactive halogen, cyanide, 1,3-diene or conjugated polyunsaturated groups. Although a number of reactions are possible, preferably, the highly reactive calcium species undergoes oxidative addition to bromide, chloride, iodide, and fluoride-containing polymers. The products of these reactions, e.g., the insoluble calcium-substituted polymeric reagents, can then react with a variety of electrophiles to yield functionalized polymers.

The calcium-substituted polymeric reagents are in their most general sense polymers substituted with calcium atoms. They are preferably polymers with pendant aliphatic, aryl, arylalkyl, or heterocyclic groups substituted with calcium atoms. They can also have pendant aliphatic, aryl, arylalkyl, or heterocyclic groups substituted with halogen, cyanide, 1,3-diene, and conjugated polyunsaturated groups, or such groups within, or directly attached to, the polymer backbone. Preferably, the calcium-substituted polymeric reagents of this invention are aliphatic, aryl, heterocyclic, arylalkyl based polymeric calcium-substituted reagents, derived from the foregoing highly reactive calcium species. Although the exact nature of these reagents is not known, they may involve coordination or complexation with the solvent or lithium ions. Herein, "reagent" is used in its usual sense to mean a substance that can be used in a reaction for the purpose of producing other substances.

For the polymers containing 1,3-diene or other conjugated polyunsaturated groups, the mechanistic aspects of the addition of calcium involve the transfer of the calcium atom with its two valence electrons to the 1,3-diene or conjugated polyunsaturated system. For the polymers containing halogen or cyanide groups, the mechanistic aspects of the reactions involve an oxidative addition of the highly reactive calcium species to the carbon-halide or carbon-cyanide bond. For example, the mechanism of the oxidative addition reaction of the calcium species to the halide compounds involve the addition of calcium atoms into the aryl-halide or alkyl-halide bond of the polymers. Thus, there is loss of halide atoms directly bonded to the polymer. The halide atoms are replaced by calcium atoms, which are directly bonded to the polymer in a covalent interaction. Once incorporated into the polymer, the calcium atoms have a formal oxidation state of +2. Although the halide atoms are shown intimately associated with the calcium atoms, this is not necessarily the situation as the halide atoms may be dissociated, as in an ionic manner. The calcium-halide groups, or just calcium groups, are then replaced by the organic radicals of the electrophiles. See the examples shown in Schemes I and II.

SCHEME I

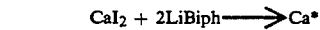

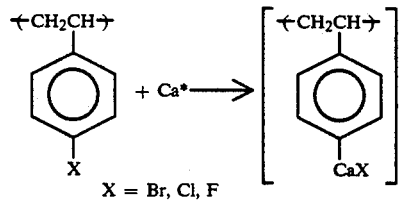

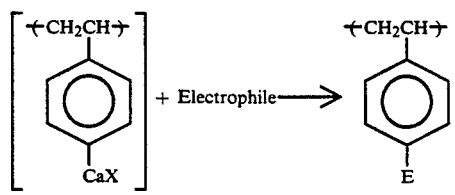

SCHEME II

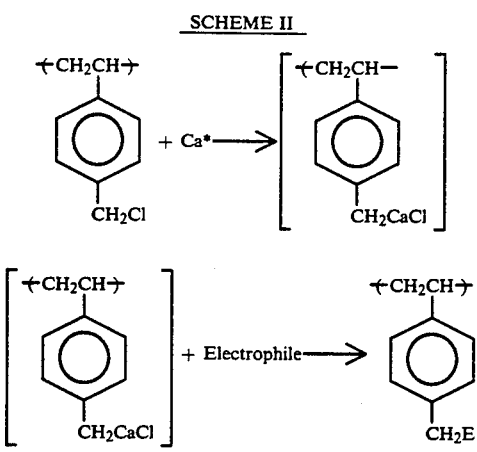

The calcium-substituted polymeric reagents, preferably insoluble reagents, of the present invention are generally formed using an equivalent amount or an excess of the highly reactive calcium species based on the amount of the reactive substituent, e.g., the halogen, in the polymer. Preferably, the highly reactive calcium is used in an amount of about 1.0–5.0 equivalents, more preferably about 1.5–3.0 equivalents calcium, and most preferably about 1.5–2.5 equivalents calcium per equivalent of reactive group or substituent. Upon the formation of the calcium-substituted polymeric reagent, the excess highly reactive calcium is typically removed from the polymer before further reactions are conducted.

As shown in Example 2 and Table I, the transformation to an insoluble calcium-substituted reagent can occur quantitatively under a variety of reaction conditions. The preferred conditions of the reaction are typically chosen to reduce the amount of cross-linking. The calcium is typically added to the polymers under an inert atmosphere, such as nitrogen or argon. The temperature of the reaction mixture is preferably within a range of about −140° C. to 100° C., more preferably within a range of about −80° C. to 60° C., and most preferably within a range of about −45° C. to 30° C., in order to reduce the amount of additional cross-linking that might occur. The reactions typically occur within about 0.1–120 hours.

The solvent in which the preparation of the calcium-substituted polymeric reagents is carried out can be an ethereal, polyethereal, or hydrocarbon solvent such as ethyl ether, tetrahydrofuran, glyme, diglyme, triglyme, benzene, and the like. As in the preparation of the soluble highly reactive calcium species, if a hydrocarbon solvent is used, it preferably contains a solubilizing agent such as N,N,N',N'-tetramethylethylenediamine, or other diamine or bidentate ligand. Preferably, the solvent in which the calcium-substituted polymeric reagents are prepared is an ethereal or polyethereal solvent.

The insoluble calcium-substituted polymeric reagents described above can undergo reaction with a soluble Cu(I) or Cu(II) salt, such as CuCN.2LiBr, CuI, CuBr, CuCl, CuF, lithium thienylcyanocuprate, or other Cu(I) or Cu(II) salts with nonprotic anions, to form new reagents with unique and different chemical reactivity and selectivity. These reagents are herein referred to as calcium-substituted polymeric cuprate reagents. Preferably, the Cu(I) salt used to prepare these calcium/copper reagents is CuCN.2LiBr or lithium thienylcyanocuprate.

The reaction conditions used for the formation of the calcium-substituted polymeric cuprate reagents are those typically designed to preserve the integrity of the polymeric reagents. These conditions include the exclusion of water and oxygen, temperatures of less than about 100° C., preferably within a range of about −140° C. and about 100° C., and more preferably within a range of about −80° C. and about 30° C. The copper salt is usually added in an equimolar amount relative to the amount of reactive substituents on the polymers prior to reaction with the highly reactive calcium species, but the copper salt can be added in an excess amount. Preferably the copper salts are added to the calcium-substituted polymeric reagents in an amount within a range of about 1.05 to 1.10 equivalents per equivalent of reactive group in the polymer prior to reaction with the zerovalent calcium species.

Although, not intending to be limiting in any manner, it is believed that the copper is bound to a carbon on the polymer, and that the calcium may be in equilibrium with, or loosely coordinated with, the copper reagent. In general, the calcium enhances the reactivity of the organocopper reagent in subsequent reactions with electrophiles. Although not intended to be limited by theory, it is believed that the calcium atoms interact both with the copper and with the electrophile; however this is probably a function of the electrophile.

The calcium-substituted polymeric cuprate reagents are composed of a mixture or combination of an aliphatic, aryl, heterocyclic, arylalkyl polymeric calcium cuprate complexes and alkali metal salts. The alkali metal salts are from the copper salt, which is preferably a thienylcyanide, cyanide, or halide. More preferably it is a thienylcyanide or a cyanide. Exemplary schematics of the formation of the calcium-substituted cuprate reagents using halide-substituted polystyrene resins are shown in Schemes III and IV.

SCHEME III

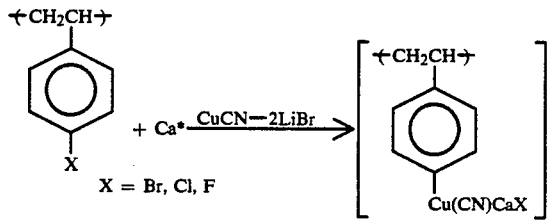

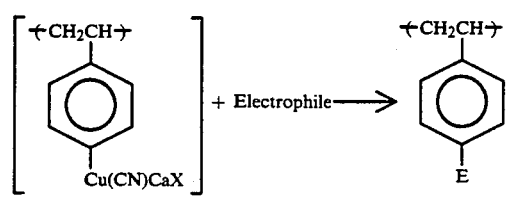

Scheme IV

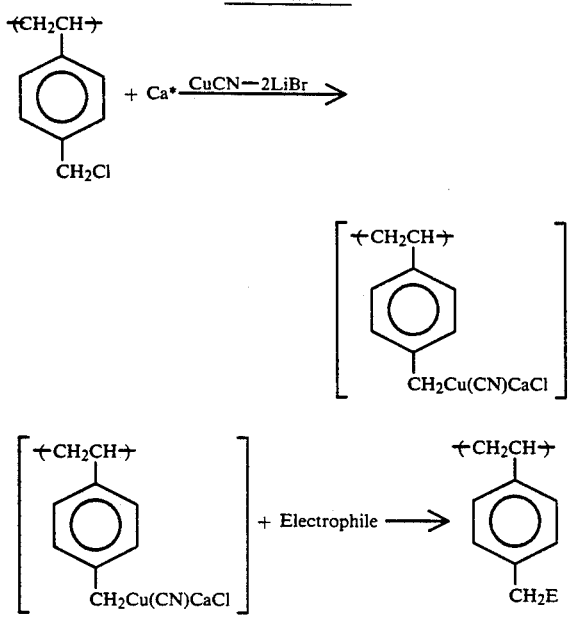

The calcium-substituted polymeric reagents, as well as the calcium-substituted polymeric cuprate reagents, of the present invention can be isolated and stored at room temperature, under an inert atmosphere, without appreciable loss in reactivity. They can be stored for even longer periods of time if lower temperatures are used.

These calcium-substituted polymeric reagents and calcium-substituted cuprates undergo a variety of reactions with electrophiles. That is, these calcium-substituted polymeric reagents and calcium-substituted cuprates undergo a variety of reactions with compounds that are deficient in electrons, such as acid chlorides, ketones, aldehydes, nitriles, esters, amides, α,β-unsaturated carbonyl compounds, epoxides, and the like. For example, the calcium-substituted polymeric cuprates undergo cross-coupling with acid chlorides to generate ketones, reaction with functionalized halides, and 1,4-conjugate addition to α,β-unsaturated carbonyl compounds, such as 2-cyclohexen-1-one, etc.

The electrophiles include, but are not limited to, $D_2O$, $H_2O$, $CO_2$, $ClSiPh_3$, $ClPPh_2$, $C_6H_{10}O$, $C_6H_5CHO$, $ClSiMe_3$, $BrCH_2CH_2Br$, $C_5H_8O$, $C_6H_5COCl$, p-$ClC_6H_5COCl$, $CH_3COCl$, $Br(CH_2)_3CN$, $Br(CH_2)_3CO_2Et$, $C_6H_8O$, and $ClSnMe_3$, $ClSnPh_3$, p-$BrC_6H_5COCl$. Using methods according to the present invention, and the above-listed electrophiles, polymers can be functionalized with any of the following substituents: —H, —D, —$CH_3$, —$CH_2D$, —COOH, —$CH_2COOH$, —$SiPh_3$, —$SiMe_3$, —$CH_2SiMe_3$, —$PPh_2$, —$CH_2PPh_2$, —$C(OH)C_5H_{10}$, —$CH_2C(OH)C_5H_{10}$, —$CH(OH)C_6H_5$, —$CH_2CH(OH)C_6H_5$, —$CH_2CH_2Br$, —$CH_2C_5H_8(OH)$, —$COC_6H_5$, —$COC_6H_5(p-Cl)$, —$COCH_3$, —$(CH_2)_3CN$, —$(CH_2)_3CO_2Et$, —$C_6H_9O$, —$CH_2COC_6H_5$, —$CH_2COCH_3$, —$(CH_2)_4CN$, —$(CH_2)_4CO_2Et$, —$CH_2C_6H_9O$, and the like.

The reaction conditions of the reactions with the electrophiles include temperatures within a range of about −140° C. to about 100° C., preferably within a range of about −80° C. to about 30° C., and most preferably within a range of about −30° C. to about 15° C. The electrophiles are typically present in an amount of about 1-10 equivalents, or more, per calcium or calcium-cuprate functional group. Preferably, the electrophiles are present in an amount of about 1-5 equivalents, and most preferably in an amount of about 1-2.5 equivalents. The reactions typically occur within about 0.1-120 hours.

These calcium-substituted polymeric reagents and calcium-substituted cuprate polymeric reagents can be used in a variety of reaction schemes. For example, reaction of acetyl chloride with the calcium cuprate reagent gives the ketone-containing polymer in a quantitative yield. In addition, these calcium cuprate reagents undergo conjugate 1,4-addition with α,β-unsaturated ketones, aldehydes, esters, and amides.

Bifunctionalization of the polymer can be achieved by the addition of highly reactive calcium to a functionalized polymer containing a halogen. That is, a polymer containing a group reactive with the soluble calcium species described above can be reacted with the calcium species and an electrophile to functionalize the polymer with a substituent containing another group reactive with the calcium species. This functionalized polymer can be further reacted with the calcium species and a second electrophile to form a bifunctionalized polymer. Examples are shown in Example 8 and Table VIII.

In general, the calcium species can be used in the functionalization of polymers with dyes, UV stabilizers, indicators, drug systems, biologically active substrates, and molecules that impart conducting properties, magnetic properties, nonlinear optical properties, adhesive properties, thermal stability, or increased strength. This list is not inclusive as there are many other desirable functional groups that can be attached to polymers containing groups reactive with the highly reactive calcium species described above.

Polymer-Bound Biphenyl Complex of a Highly Reactive Zerovalent Calcium Species Although the soluble zerovalent calcium species of the present invention is highly useful, it typically includes zerovalent calcium atoms in mixture or combination with alkali metal salts. Because the zerovalent calcium species is soluble, as are the alkali metal salts, no simple separation can be achieved. Thus, it is highly desirable to prepare an alternative form of the highly reactive zerovalent calcium species that can be separated from the alkali metal salts.

In preferred embodiments of the present invention the highly reactive zerovalent calcium species does not include alkali metal salts. Rather, the zerovalent calcium species is in combination or complexation with an insoluble polymer-bound biphenyl network, i.e., an insoluble polymeric network with pendant biphenyl groups. The polymer can be of any type described herein which is substantially insoluble in hydrocarbon, ethereal, and polyethereal solvents. By preparing a highly reactive zerovalent calcium species in the presence of an insoluble polymer-bound biphenyl network, any alkali metal salts, e.g., alkali metal halide salts, can be washed away. Thus, this zerovalent calcium complex of polymer-bound biphenyl can be used to prepare organocalcium compounds without the interaction of alkali metal salts.

In the preparation of the zerovalent calcium complex of polymer-bound biphenyl, the initial step is the preparation of a calcium-substituted polymeric reagent containing pendant phenyl groups. The soluble zerovalent calcium species of the present invention is used as discussed above to prepare this calcium-substituted polymeric reagent containing phenyl groups, e.g., calcium-substituted polystyrene. The calcium-substituted polymeric reagent is then combined with a phenyl halide in the presence of an effective amount of a Pd(0) catalyst in any hydrocarbon, ethereal, or poylethereal solvent useable for the preparation of the calcium-substituted polymeric reagent. The phenyl halide is preferably a phenyl bromide, phenyl chloride, and phenyl iodide. More preferably, the phenyl halide is a phenyl iodide. The phenyl group of the phenyl halide replaces the calcium of the calcium-substituted polymeric reagent to form a polymer-bound biphenyl group, i.e., a polymer network with pendant biphenyl groups.

The Pd(0) catalyst is any of a variety of catalyst systems such as PdL$_4$, PdL$_2$L'$_2$, PdLL'$_3$, or Pd(L—L)$_2$ catalyst wherein L and L' are selected from the group consisting of PF$_3$, PPh$_3$, P(OR)$_3$ (wherein R=any aliphatic, aryl, or vinyl group), AsPh$_3$, CO, CN, PEtPh$_2$, PEt$_2$Ph, P(4-MeC$_6$H$_4$)$_3$, SbPh$_3$, CNR (wherein R=any aliphatic, aryl, or vinyl group), and R—C≡C—R (wherein R=any aliphatic, aryl, or vinyl group), and wherein L—L is selected from the group consisting of cyclooctadiene, 1,2-bis(diphenylphosphino)ethane, 1,3-bis(diphenylphosphino)propane, and [(2,2-dimethyl-1,3-dioxolane-4,5-diyl)bis(methylene)]diphenylphosphine. For example, the Pd(0) catalyst can be Pd(PPh$_3$)$_4$, polymer-bound Pd(PPh$_3$)$_4$, Pd(PF$_3$)$_4$, Pd(PEtPh$_2$)$_4$, Pd(PEt$_2$Ph)$_4$, Pd[P(OR)$_3$]$_4$ (wherein R is any aliphatic, aryl, or vinyl group), Pd[P(4-MeC$_6$H$_4$)$_3$]$_4$, Pd(AsPh$_3$)$_4$, Pd(SbPh$_3$)$_4$, Pd(CO)$_4$, Pd(CN)$_4$, Pd(CNR)$_4$ (wherein R is any aliphatic, aryl, or vinyl group), Pd(R—C≡C—R) (wherein R is any aliphatic, aryl, or vinyl group), Pd(PF$_3$)$_2$, Pd(dppe)$_2$ wherein dppe=1,2-bis(diphenylphosphino)ethane, Pd(cod)$_2$ wherein cod=cyclooctadiene, Pd(dppp)$_2$ wherein dppp=1,3-bis(diphenylphosphino)propane, bis[2,2-dimethyl-1,3-dioxolane-4,5-diyl)bis(methylene)]diphenylphosphine palladium, and bis(dibenzylideneacetone) palladium. More preferably, the Pd(0) catalyst is selected from the group consisting of Pd(PPh$_3$)$_4$, Pd(dppe)$_2$, and Pd(dPPP)$_2$.

An "effective amount" of the catalyst is used, which is an amount that will effect the cross-coupling reaction within 24 hours or less. The catalyst is preferably used in an amount of about 0.1–20.0 mole-% relative to the calcium-substituted polymeric reagent, and more preferably in an amount of about 0.1–5.0 mole-%. The phenyl halide is preferably used in an amount of about 1.1–2.5 equivalents relative to the calcium-substituted polymeric reagent, and more preferably in an amount of about 1.1–1.3 equivalents. The temperature at which this reaction between a phenyl halide and a calcium-substituted polymeric-reagent containing pendant phenyl groups is carried out at about −100° C. to 80° C., preferably within a range of about −50° C. to 80° C. This reaction sequence can be represented by the following exemplary scheme:

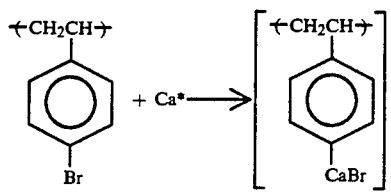

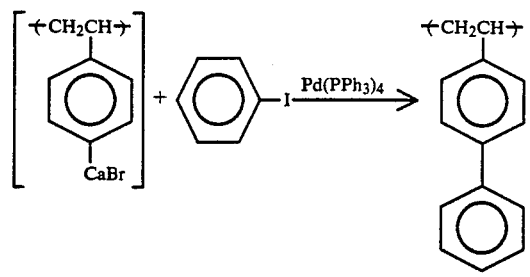

This polymer-bound biphenyl, i.e., polymeric network containing pendant biphenyl groups, can be reduced using a reducing agent having a reduction potential of about −2.0 volts or more negative relative to SCE. Preferably the reducing agent is an alkali metal reducing agent, and more preferably an alkali metal arene reducing agent. Most preferably, the reducing agent is an alkali metal substituted biphenylide, such as lithium di-tert-butylbiphenyl. This reduction can be carried out in any hydrocarbon, ethereal, or polyetherereal solvent as herein described. The reduction is carried out at a temperature of about −100° C. to about 50° C., preferably at a temperature of about −78° C. to about 25° C. The amount of reducing agent used is about 1.1–2.5 equivalents relative to the amount of polymer-bound biphenyl, preferably 1.1–1.3 equivalents of the reducing agent is used.

This reduced polymer-bound biphenyl network is then combined with a Ca(II) salt to reduce the calcium to a highly reactive zerovalent species complexed with the insoluble polymer-bound biphenyl network. The reduced polymer-bound biphenyl acts as an electron sink, such that the electrons from the reducing agent are then transferred to the Ca(II) salt. The Ca(II) salt can be any of those used in the preparation of the soluble highly reactive zerovalent calcium species of the present invention. Preferably about 2.1–3.5 equivalents of the Ca(II) salt is used relative to the polymer-bound reduced biphenyl, and more preferably about 2.1–2.5 equivalents. This reaction is typically carried out in the same reaction flask in which the reduction of the polymer-bound biphenyl occurs. Preferably the reaction is carried out at a temperature of about −78° C. to 30° C. The following is a representative reaction scheme:

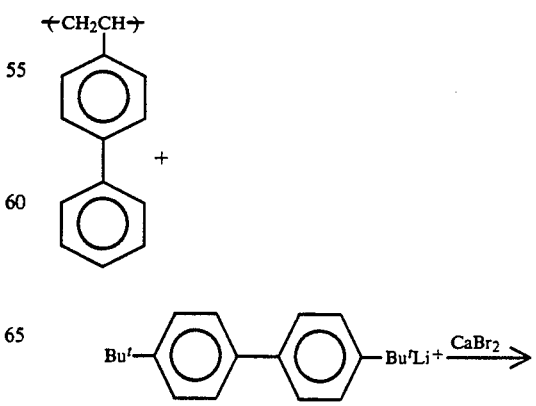

-continued

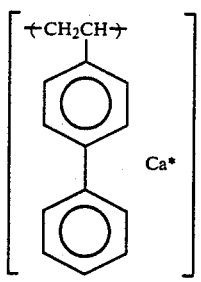

The interaction between the polymer-bound biphenyl groups and the zerovalent calcium is believed to be a weak covalent interaction. That is, the zerovalent calcium atoms are believed to interact with the aromatic pi cloud of the biphenyl groups. This bond is formally a pi bond, as is found in ferrocene, rather than the traditional sigma bond found, for example, in an alkyl Grignard reagent. This is distinct from any ion exchange resins wherein calcium ions interact with the resins in an ionic interaction, or in a sigma-type fashion wherein the metal orbitals interact with a single hydrid orbital from a single carbon atom.

The insoluble zerovalent calcium species, i.e., the polymer-bound biphenyl complex of a highly reactive zerovalent calcium species, is particularly advantageous because soluble alkali metal salts can be washed away from the zerovalent calcium species. Furthermore, once the zerovalent calcium is used in a reaction, the insoluble polymer having pendant biphenyl groups can be collected, washed, and recycled.

This form of highly reactive zerovalent calcium species can also be used in any of the reactions discussed herein, or any reaction that the soluble zerovalent calcium species can be involved in, such as reaction with alkyl, aryl, and vinyl halides to form organocalcium reagents, without the interaction of alkali metal salts. It can be used in reactions with hydrogen gas to form calcium hydride (CaH) in a polymer matrix. This reaction is envisioned to be reversible, thereby resulting in a unique hydrogen storage device. It will also react with perfluoroalkanes regioselectively at low temperatures to produce the corresponding perflouro-organocalcium reagent.

The invention will be further exemplified with respect to the various specific and preferred embodiments and techniques. It should be understood, however, that many variations and modifications may be made while remaining within the scope of the invention.

Experimental Examples

FTIR (fourier transform infrared spectroscopy, diffuse reflectance) spectra were taken on an Analect TM RFX-65 FTIR spectrometer with KBr as the mull. Mass spectra were performed on Kratos TM MS-50 and MS-80 spectrometers by the Midwest Center for Mass Spectrometry at the University of Nebraska-Lincoln. The polymer samples were heated ballistically to 400° C. Elemental analyses were performed by Galbraith Laboratories, Inc. (Knoxville, Tenn.) and Desert Analytics (Tucson, Ariz.).

All manipulations were carried out under an atmosphere of argon on a dual manifold/argon system. The Linde TM prepurified grade argon was further purified by passage over a BASF TM R3-11 catalyst at 150° C., a phosphorus pentoxide column, and a column of granular potassium hydroxide. Lithium ribbon (28 mm wide×0.38 mm thick), biphenyl, naphthalene, or anthracene and CaI$_2$ were weighed out and charged into reaction flasks under argon in a Vacuum Atmospheres Company drybox. Tetrahydrofuran was distilled from Na/K alloy under an argon atmosphere immediately before use. Technical grade wash solvents were used as received. Anhydrous calcium(II) iodide and bromide were purchased from Cerac, Inc., Milwaukee, Wis. Anhydrous calcium(II) chloride was purchased from Alfa Chemicals, Denver, Colo. All other reagents were used as received unless otherwise specified.

The degrees of functionalization (DF) and functional yields of the polymers represent the fraction of the polymer functionalized with the desired functionality. For polystyrene, they represent the fraction of aromatic rings that possess the desired functionalities. p-Bromopolystyrene was purchased from either Lancaster Synthesis, LTD (Windham, N.H., 2.44 mmol Br/g, DF=0.31, 2% DVB cross-linking, 200–400 mesh), or Fluka (Ronkonkoma, N.Y., 5.47 mmol Br/g, DF=0.98, 2% DVB cross-linking, 200–400 mesh). Chloromethylated polystyrene was purchased from either Kodak Chemicals (Rochester, N.Y., 1.06 mmol Cl/g, DF=0.11, 1% DVB cross-linking, 200–400 mesh), or Lancaster Synthesis, LTD (Windham, N.H., 5.50 mmol Cl/g, DF=0.80, 2% DVB cross-linking, 200–400 mesh). p-Chloropolystyrene (3.75 mmol.Cl/g, DF=0.45, 3% DVB cross-linking, 200–400 mesh) and p-fluoropolystyrene (2.59 mmol F/g, DF=0.28, 3% DVB cross-linking, 200–400 mesh) were prepared from known literature procedures. See L. R. Melby et al., *J. Amer. Chem. Soc.*, 89, 450 (1967) for the analogous synthesis of iodo-polystyrene, which is incorporated herein by reference. In general, polyvinyl alcohol, styrene, p-halostyrene, divinylbenzene, and benzoyl peroxide in water are heated at 80°–90° C. for 5 hours to form the snow-white bead polymer.

Acid-base titrations of the carboxylated polymers were performed following literature procedures. See L. Anand et al., *Macromol. Sym.*, 4, 9 (1972) and M. J. Farrall et al. *J. Org. Chem.*, 41, 3877 (1976), which are incorporated herein by reference. The functional yield of the carboxylated polymer was based on acid-base titration. Low-temperature reactions were performed utilizing a Neslab Endocal TM ULT-80 refrigerated circulating bath or using dry ice/acetonitrile or acetone slush baths. Deuterium oxide (99.7%) was purchased from Fischer Scientific (Pittsburg, Pa.).

EXAMPLE 1

Preparation of Highly Reactive Calcium

Lithium (2.05 mmol) and biphenyl (2.46 mmol) were stirred in freshly distilled THF (15 mL) at room temperature under argon until the lithium was substantially completely consumed (approximately 2 hours). To a well-suspended solution of CaI$_2$ (1.00 mmol) in THF (15 mL), the preformed lithium biphenylide was transferred via a cannula at room temperature. The solution of highly reactive calcium was stirred for 1 hour at room temperature.

EXAMPLE 2

Preparation of Insoluble Calcium-Substituted Polymeric Reagents

An excess (i.e., 1.5–2.5 equivalents; based on starting halogen) of highly reactive calcium, prepared according to the procedure in Example 1, was added to lightly cross-linked (approximately 1–3%) polystyrene ("PS") resins containing halogen moieties (Br, Cl, F, $CH_2Cl$) at 0° C. or room temperature in THF under an inert atmosphere. Upon formation of the calcium-substituted polymeric reagent, the excess highly reactive calcium was removed from the polymer. As shown in Table I, the transformation to a calcium-substituted polymeric reagent can occur quantitatively under a variety of reaction conditions as evidenced by elemental analysis of the corresponding halogen after aqueous quenching. Preferably, the formation took place at room temperature or below in order to minimize any additional cross-linking that might occur. When the calcium-substituted reagents were prepared at 0° C. and isolated, red-brick colored solids were obtained while dark to medium brown colored solids were obtained when the reaction was carried out at room temperature. The reactivity of the corresponding calcium-substituted reagents were similar, and in many instances identical, in subsequent reactions. These reagents were stored under nitrogen at room temperature for about 1–2 months without noticeable loss in color. When exposed to air, the solids immediately decomposed and changed color. In the case of p-bromopolystyrene ("PS-Br"), the calcium-substituted reagent turned light tan while the chloromethylated polystyrene yielded a light yellow solid. Elemental analyses of the isolated calcium-substituted reagents confirmed the presence of calcium.

TABLE I

Reaction Conditions of Halogenated Polystyrene Resins With Highly Reactive Calcium

| Entry | Starting Polymer | Time (h) | Temp. (°C.) | Loss of $X^a$ |
|---|---|---|---|---|
| 1 | PS—$Br^{b,c}$ | 4 | 60 | 100 |
| 2 | PS—$Br^{b,c}$ | 24 | RT | 79 |
| 3 | PS—$Br^{b,c}$ | 36 | RT | 100 |
| 4 | PS—$Br^{c,d}$ | 10 | 0 | 99 |
| 5 | PS—$BR^{c,e}$ | 48 | RT | 86 |
| 6 | PS—$CH_2Cl^{d,f}$ | 6 | 0 | 100 |
| 7 | PS—$CH_2Cl^{d,f}$ | 6 | RT | 100 |
| 8 | PS—$CH_2Cl^{b,g}$ | 24 | RT | 77 |
| 9 | PS—$CH_2Cl^{b,g}$ | 36 | RT | 100 |
| 10 | PS—$CH_2Cl^{b,g}$ | 4 | 60 | 100 |
| 11 | PS—$Cl^{d,h}$ | 80 | $RT^j$ | 100 |
| 12 | PS—$F^{d,i}$ | 80 | $RT^j$ | 100 |

$^a$Loss of directly bound halogen (X) based on elemental analysis of halogen (X).
$^b$[Ca]/[X] = 2.5:1.
$^c$p-Bromopolystyrene, 2.44 mmol Br/g, DF = 0.31, 2% DVB.
$^d$[Ca]/[X] = 1.5:1.
$^e$p-Bromopolystyrene, 5.47 mmol Br/g, DF = 0.98, 2% DVB.
$^f$Chloromethylated polystyrene, 1.06 mmol Cl/g, DF = 0.11, 1% DVB.
$^g$Chloromethylated polystyrene, 5.50 mmol Cl/g, DF = 0.80, 2% DVB.
$^h$p-Chloropolystyrene, 3.75 mmol Cl/g, DF = 0.45, 3% DVB.
$^i$p-Fluoropolystyrene, 2.59 mmol F/g, DF = 0.28, 3% DVB.
$^j$Stirred at −78° C. for 1 hour followed by warming to room temperature.

EXAMPLE 3

Preparation of Insoluble Calcium-Substituted Polymeric Reagents from p-Bromopolystyrene and Reactions Thereof The reaction of a 2% cross-linked p-bromopolystyrene with the soluble highly reactive calcium species to prepare the calcium-substituted reagent occurred almost quantitatively after 10 hours at 0° C. When the reaction was carried out at room temperature, 36 hours was needed for complete formation of the calcium-substituted reagent. The reaction was done without filtration of the excess highly reactive calcium from the polymer without significant detrimental effect to the functional yields. Reaction with $CO_2(g)$ at −45° C. followed by hydrolysis afforded the carboxylated product (Table II, entry 3) in 83% functional yield. The functional yield of the carboxylated polymer was based on acid-base titration. The yield is comparable to yields previously reported involving lithiation (80–95%) and Grignard formation (>70%) of p-bromopolystyrene.

The addition of triphenylchlorosilane with the calcium-substituted reagent gave the silylated product (Table II, entry 4) in 72% yield. The FTIR spectrum of the product showed the presence of strong peaks at 1248 and 758 $cm^{-1}$ corresponding to the Si—C bonds and the absence of the aryl bromide precursor at 1492, 1408, 1072, 1010, and 718 $cm^{-1}$. The calcium-substituted reagent underwent Grignard-type reactions with cyclohexanone and benzaldehyde to yield the corresponding tertiary and secondary alcohols, respectively. The latter reaction yielded the secondary alcohol in a quantitative yield (Table II, entry 7). The addition of chlorotrimethylsilane (TMSCl) to the calcium-substituted reagent afforded the silylated product (Table II, entry 8) in a 43% yield. Addition of the TMSCl at various temperatures (i.e., −45° C., 0° C. or room temperature) resulted in the same functional yields with no improvement observed at the lower temperatures or with longer reaction times.

The addition of a calcium species, prepared from $CaI_2$ and preformed lithium anthracenide, to p-bromopolystyrene (DF=0.31) at 0° C. for 10 hours and subsequent reaction with benzaldehyde at room temperature for 48 hours yielded the functionalized polymer in 80% yield. By elemental analysis, 98% Br was lost from the polymer. The dark calcium species appears to be reasonably soluble and may be a calcium anthracene complex.

TABLE II

Reactions Involving Calcium-Substituted Polymeric Reagents Prepared from p-Bromopolystyrene$^a$ and Highly Reactive Calcium

| Entry | Electrophile | Product | Yield$^b$ (%) |
|---|---|---|---|
| 1 | $H_2O$ | PS—H | 100 |
| 2 | $D_2O$ | PS—$D^c$ | — |
| 3 | $CO_2$ | PS—COOH | $83^d$ |
| 4 | $ClSiPh_3$ | PS—$SiPh_3$ | 72 |
| 5 | $ClPPh_2$ | PS—$PPh_2$ | 71 |
| 6 | $C_6H_{10}O^e$ | PS—$C(OH)C_5H_{10}$ | 51 |
| 7 | $C_6H_5CHO$ | PS—$CH(OH)C_6H_5$ | 100 |
| 8 | $ClSiMe_3$ | PS—$SiMe_3$ | 43 |
| 9 | $BrCH_2CH_2Br$ | PS—$CH_2CH_2Br$ | 17 |

$^a$Bromopolystyrene, 2.44 mmol Br/g, DF = 0.31, 2% DVB cross-linking.
$^b$Elemental analyses.
$^c$FTIR and EI-MS.
$^d$Titration of COOH groups.
$^e$Cyclohexanone.

Preparation of PS-H p-Bromopolystyrene (1.21 mmol Br, based on 2.44 mmol Br/g, DF=0.31, 2% DVB cross-linking) was stirred in freshly distilled THF (30 mL) at room temperature for 24 hours prior to use. This was done for the purpose of swelling, i.e., unfolding or exposing, the polymer so as many of the Br groups as possible could be exposed to the highly reactive calcium. Highly reactive calcium (3.02 mmol) was transferred via a cannula to the polymer at room temperature. The resulting dark solution was stirred for 48 hours at room temperature. At this time the polymer was filtered and washed with THF (15 mL). Fresh THF (30 mL) was added to the polymer and deionized water (15 mL) was added via a syringe. The solution was stirred for 44 hours at room temperature at which time the polymer was filtered and washed with 100 mL portions of H$_2$O (2), THF (1), MeOH (1), acetone (1), and MeOH (1). The product was dried under vacuum for 24 hours at room temperature and yielded 0.3419 g of a light brown powder. FTIR (diffuse reflectance): peaks absent at 1492, 1407, 1070, 1008, and 718 cm$^{-1}$ for the aryl bromide precursor. Anal. Br=0.00.

Preparation of PS-D

Highly reactive calcium (2.82 mmol) was added to a solution containing p-bromopolystyrene (1.25 mmol Br) and stirred for 36 hours at room temperature. Deuterium oxide (5 mL) was added and stirred for 48 hours at room temperature. Isolation of the polymer yielded 0.5257 g of a light brown powder. FTIR: peak observed at 2255 cm$^{-1}$ for the C-D bond. High resolution electron impact mass spectrometry (HR EI-MS) yielded fragments at 105.0695 m/e for C$_8$H$_7$D+ (10.30%), at 131.0359 m/e for C$_{10}$H$_{11}$+ (2.39%), and at 104.0623 m/e for C$_8$H$_8$+ (26.90%). Anal. Br=0.00.

Preparation of PS-COOH

Highly reactive calcium (2.92 mmol) was added to a solution containing p-bromopolystyrene (1.17 mmol Br) and stirred for 48 hours at room temperature. Gaseous carbon dioxide was passed through a column of Drierite TM (anhydrous calcium sulfate available from Aldrich Chemical Co., Inc., Milwaukee, Wis.) and bubbled into the solution at −45° C. for 2 hours, 0° C. for 1 hour, and at room temperature for 1 hour. To this reaction mixture, 0.5N HCl (15 mL) was added. The mixture was stirred for 30 minutes at room temperature. The polymer was filtered and washed with portions of 0.5N HCl, THF, and MeOH. Drying yielded 0.3758 g of a tan powder. FTIR: peaks observed at 1733 and 1684 cm$^{-1}$ for the carboxyl group. Acid-base titrations yielded 2.03 mmol COOH/g or 83% functional yield. Anal. Br=0.00.

Preparation of PS-SiPh$_3$

Highly reactive calcium (3.02 mmol) was added to a solution containing p-bromopolystyrene (1.19 mmol Br) and stirred for 40 hours at room temperature. Chlorotriphenylsilane (3.38 mmol) in THF (10 mL) was added and stirred for 50 hours at room temperature. Isolation and purification yielded 0.3419 g of a light brown powder. FTIR: observed peaks at 1248 and 758 cm$^{-1}$ for the Si—C bond. HR EI-MS yielded fragments at 259.0939 m/e for C$_{18}$H$_{15}$Si+ (3.40%), 130.0773 m/e for C$_{10}$H$_{10}$+ (3.21%), and 104.0625 m/e for C$_8$H$_8$+ (96.09%). Anal. calcd. for (C$_{10}$H$_{10}$)$_{0.02}$(C$_8$H$_8$)$_{0.76}$(C$_{26}$H$_{22}$Si)$_{0.22}$, Si=3.82; Found: Si=3.58, Br=0.00. Functional yield=72%.

Preparation of PS-PPh$_2$

Highly reactive calcium (3.04 mmol) was added to a solution containing p-bromopolystyrene (1.20 mmol Br) and stirred for 48 hours at room temperature. Chlorodiphenylphosphine (6.15 mmol) in THF (10 mL) was added at 0° C. and stirred for 1 hour. The mixture was then warmed to room temperature over a period of 48 hours. A 3:1 mixture of acetone/H$_2$O (20 mL) was added to the polymer, which was then stirred for 1 hour at room temperature. Isolation and purification yielded 0.3590 g of a tan powder. FTIR: observed weak peaks at 1005, 1457 and 1492 cm$^-$ for the P-Ar bonds. Anal. Calcd. for (C$_{10}$H$_{10}$)$_{0.02}$(C$_8$H$_8$)$_{0.76}$(C$_{20}$H$_{17}$P)$_{0.22}$, P=4.69; Found: P=4.38, Br=0.00. Functional yield=71%.

Preparation of PS-C(OH)C$_5$H$_{10}$

Highly reactive calcium (2.55 mmol) was added to a solution containing p-bromopolystyrene (1.04 mmol Br) in THF (30 mL) and stirred for 48 hours at room temperature. Cyclohexanone (5.67 mmol) in THF (10 mL) was added at −45° C. and the mixture was stirred for 1 hour. It was then allowed to warm from −45° C. to room temperature over a period of 70 hours. Water (20 mL) was added and the reaction mixture was stirred for 1 hour at room temperature. Isolation and purification yielded 0.2912 g of a tan powder. FTIR: observed sharp peak at 3643 cm$^{-1}$ for "free" OH stretch, broad OH stretch around 3460 cm$^{-1}$ and the C—O stretch at 1028 cm$^{-1}$. HR EI-MS yielded fragments at 82.0792 m/e for C$_6$H$_{10}$+ (22.90%), 81.0721 m/e for C$_6$H$_9$+ (57.51%), 98.0733 m/e for C$_6$H$_{10}$O+ (19.25%), 104.0627 m/e for C$_8$H$_8$+ (11.74%), and at 129.076 m/e for C$_{10}$H$_9$+ (2.28%). Anal. calcd. for (C$_{10}$H$_{10}$)$_{0.02}$(C$_8$H$_8$)$_{0.82}$(C$_{14}$H$_{18}$O)$_{0.16}$, C=89.80, H=8.07, O=2.12; Found: C=89.85, H=7.46, O=1.89, Br=0.00. Functional yield=51%.

Preparation of PS-CH(OH)C$_6$H$_5$

Highly reactive calcium (1.97 mmol) was added to a solution containing p-bromopolystyrene (1.31 mmol Br) in THF (30 mL) and stirred for 48 hours at room temperature. The polymer was filtered, fresh THF (30 mL) was added, and the mixture was cooled to −45° C. Benzaldehyde (5.70 mmol) in THF (10 mL) was added at −45° C. and stirred for 4 hours. The mixture was allowed to warm from −45° C. to room temperature over a period of 48 hours. Water (20 mL) was then added to the polymer at −45° C. The mixture was again allowed to warm to room temperature over a period of 24 hours. Isolation and purification yielded 0.3254 g of a tan powder. FTIR: observed sharp peak at 3641 cm$^{-1}$ for "free" OH stretch, broad OH stretch around 3400 cm$^{-1}$ and C—O stretch at 1027 cm$^-$. Anal. calcd. for (C$_{10}$H$_{10}$)$_{0.02}$(C$_8$H$_8$)$_{0.67}$(C$_{15}$H$_{14}$O)$_{0.31}$, C=89.14 H=7.25, O=3.60; Found: C=88.86, H=7.53, O=3.74, Br=0.00. Functional yield=100%.

Preparation of PS-SiMe$_3$

Highly reactive calcium (1.93 mmol) was added to a solution containing p-bromopolystyrene (0.48 mmol Br) in THF (30 mL) at room temperature and stirred for 48 hours. Chlorotrimethylsilane (25.47 mmol) was added neat via a syringe and stirred for 24 hours at room temperature. Isolation and purification yielded 0.1048 g of a yellow-beige powder. FTIR: observed peaks at 1247 and 756 cm$^{-1}$ for the Si—C bonds. Anal. calcd. for (C$_{10}$H$_{10}$)$_{0.02}$(C$_8$H$_8$)$_{0.847}$(C$_{11}$H$_{16}$O)$_{0.133}$, Si=3.26; Found: Si=3.08. Functional yield=43%.

Preparation of PS-CH$_2$CH$_2$Br

Highly reactive calcium (3.20 mmol) was added to a solution containing p-bromopolystyrene (1.26 mmol Br) in THF (30 mL) and stirred for 48 hours at room temperature. 1,2-Dibromoethane (6.23 mmol) in THF (10 mL) was added at room temperature and the reaction mixture was stirred for 45 hours at room temperature. Isolation and purification yielded 0.3845 g of a tan powder. FTIR: appearance of peaks at 1182 and 539 cm$^{-1}$ for alkyl bromide. Anal. calcd. for $(C_{10}H_{10})_{0.02}(C_8H_8)_{0.927}(C_{10}H_{11}Br)_{0.053}$, Br=3.83; Found: Br=3.67. Functional yield=17%.

EXAMPLE 4

Preparation of Insoluble Calcium-Substituted Polymeric Reagents from Chloromethylated Polystyrene and Reactions Thereof The addition of highly reactive calcium species to 1% cross-linked chloromethylated polystyrene to generate the benzylic calcium-substituted reagent occurred with complete loss of chlorine after 6 hours at 0° C. Addition of $CO_2$(g) at −45° C. followed by hydrolysis gave the carboxylated product (Table III, entry 3) in 93% functional yield. The functional yield of the carboxylated polymer was based on acid-base titration. The FTIR spectrum of the product confirmed the absence of the $CH_2Cl$ precursor at 1266 cm$^{-1}$ and the presence of the carboxyl group at 1711 cm$^{-1}$.

The calcium-substituted reagent reacted with cyclohexanone and benzaldehyde in Grignard-type chemistry and quantitatively yielded the tertiary and secondary alcohols, respectively (Table III, entries 5 and 6). The addition of chlorodiphenylphosphine to the calcium-substituted reagent, prepared from the more functionalized polymer (5.50 mmol Cl/g, DF=0.80, 2% DVB cross-linking), afforded the phosphine-containing polymer in 40% yield (Table III, entry 7).

The chemical reactivity of the benzylic calcium-substituted reagent was further explored with an epoxide-opening reaction. The addition of 1,2-epoxycyclopentane afforded the secondary alcohol (Table III, entry 8). The FTIR spectrum of the alcohol yielded a broad OH stretch around 3400 cm$^{-1}$ with a sharp peak at 3643 cm$^{-1}$ for the "free" OH stretch. The unbonded or "free" hydroxyl group of alcohols and phenols absorbs strongly in the 3650–3584 cm$^{-1}$ region, as evidenced by R. M. Silverstein et al., *Spectrometric Identification of Organic Compounds*, Wiley and Sons: New York, Fourth edition (1981). This may be due to the site isolation of the alcohol within the polymer and therefore no intermolecular hydrogen bonding. This is in agreement with that found when the secondary alcohol was formed using benzaldehyde (Table III, entry 6).

Preformed lithium anthracenide was reacted with calcium iodide to prepare a soluble calcium species. This calcium species was added to chloromethylated polystyrene (DF=0.11) and stirred for 24 hours at room temperature. The corresponding calcium-substituted reagent was then reacted with chlorotrimethylsilane at room temperature to yield the silylated product; however, the yield was not optimized and was lower than the yield obtained from preformed lithium biphenylide (Table III, entry 4). Reaction of the calcium species with chloromethylated polystyrene at 0° C. for 6 hours resulted in a 100% loss of chlorine from the polymer. Subsequent reaction with benzaldehyde gave the corresponding secondary alcohol in 80% yield, compared to the 100% yield when calcium biphenylide was used (Table III, entry 6).

TABLE III

Reactions Involving Calcium-Substituted Polymeric Reagents Prepared From Chloromethylated Polystyrene[a] and Highly Reactive Calcium

| Entry | Electrophile | Product | Yield[b] (%) |
|---|---|---|---|
| 1 | $H_2O$ | PS—$CH_3$ | 100 |
| 2 | $D_2O$ | PS—$CH_2$D[c] | — |
| 3 | $CO_2$ | PS—$CH_2$COOH | 93[d] |
| 4 | $ClSiMe_3$ | PS—$CH_2SiMe_3$ | 75 |
| 5 | $C_6H_{10}O$[e] | PS—$CH_2$-C(OH)$C_5H_{10}$ | 100 |
| 6 | $C_6H_5CHO$ | PS—$CH_2$CH(OH)$C_6H_5$ | 100 |
| 7 | $ClPPh_2$ | PS—$CH_2PPh_2$[c] | 40 |
| 8 | $C_5H_8O$[f] | PS—$CH_2C_5H_8$(OH) | — |

[a]Chloromethylated polystyrene, 1.06 mmol Cl/g, DF = 0.11, 1% DVB cross-linking.
[b]Elemental analyses.
[c]Prepared from the more highly functionalized chloromethylated polystyrene, 5.50 mmol Cl/g, DF = 0.80, 2% DVB; FTIR and EI-MS.
[d]Titration of COOH groups.
[e]Cyclohexanone.
[f]1,2-Epoxycyclopentane.

Preparation of PS-CH$_3$

Highly reactive calcium (0.90 mmol) was added to a solution containing chloromethylated polystyrene (0.59 mmol Cl, based on 1.06 mmol Cl/g, DF=0.11, 1% DVB cross-linking) in THF (30 mL) and stirred at 0° C. for 6 hours. The polymer was filtered and yielded a red-brick colored solid. Fresh THF (30 mL) was added to the polymer followed by the addition of deionized water (20 mL) and stirred for 24 hours at room temperature. Isolation of the product yielded 0.4495 g of an off-white powder. FTIR: absence of peak at 1266 cm$^{-1}$ for chlorinated precursor. Anal. Found: Cl=0.00.

Preparation of PS-CH$_2$D

Highly reactive calcium (11.34 mmol) was added to a solution containing chloromethylated polystyrene (2.82 mmol Cl, based on 5.50 mmol Cl/g, DF=0.80, 2% DVB cross-linking) in THF (30 mL) and stirred for 96 hours at room temperature. Deuterium oxide (10 mL) was added and stirred for 48 hours at room temperature. Isolation of the product yielded 1.0622 g of a gray powder. FTIR: observed peak at 2260 cm$^{-1}$ for C—D bond. HR EI-MS yielded fragments at 119.0847 m/e for $C_9H_9D^+$ (4.11%), at 92.0615 m/e for $C_7H_6D^+$ (9.49%), at 130.0768 m/e for $C_{10}H_{10}^+$ (1.58%), 118,0770 m/e for $C_9H_{10}^+$ (2.39%) and at 104.0617 m/e for $C_8H_8^+$ (2.51%). Anal. Found: Cl=0.27 (99% loss).

Preparation of PS-CH$_2$COOH

Highly reactive calcium (1.15 mmol) was transferred to a solution containing chloromethylated polystyrene (0.71 mmol Cl, based on 1.06 mmol Cl/g) in THF (30 mL) and stirred for 6 hours at 0° C. The polymer was filtered and fresh THF (30 mL) was added. Gaseous carbon dioxide was passed through a Drierite TM column and bubbled into the reaction flask at −45° C. for 2 hours, and at 0° C. for 1 hour. The reaction mixture was hydrolyzed with 1:1 $H_2O$/0.5N HCl (20 mL). The solution was stirred for 1 hour at 0° C. and warmed to room temperature for 12 hours. Isolation of the product yielded 0.4836 g of an off-white powder. FTIR: observed peak at 1711 cm$^{-1}$ for the carboxyl group. Acid-based titrations yielded 0.99 mmol COOH/g or 93% functional yield. Anal. Found: Cl=0.00.

Preparation of PS-CH$_2$SiMe$_3$

Highly reactive calcium (1.50 mmol) was added to a solution containing chloromethylated polystyrene (0.61 mmol Cl, based on 1.06 mmol Cl/g) in THF (30 mL) and stirred for 40 hours at room temperature. Chlorotrimethylsilane (3.05 mmol) in THF (10 mL) was added and stirred at room temperature for 48 hours. Isolation of the product yielded 5503 g of a white powder. FTIR: observed peaks at 1248 and 755 cm$^{-1}$ for the Si—C bond. Anal. calcd. for $(C_{10}H_{10})_{0.01}(C_8H_8)_{0.88}(C_9H_{10})_{0.03}(C_{12}H_{18}Si)_{0.08}$, C=89.97, H=8.01, Si=2.01; Found: C=90.02, H=7.80, Si=1.75, Cl=0.00. Functional yield=75%.

Preparation of PS-CH$_2$C(OH)C$_5$H$_{10}$

Highly reactive calcium (1.27 mmol) was added to a solution containing chloromethylated polystyrene (0.84 mmol Cl, based on 1.06 mmol Cl/g) in THF (30 mL)) and stirred for 6 hours at 0° C. The polymer was filtered and fresh THF (30 mL) was added. Cyclohexanone (2.24 mmol) in THF (10 mL) was added at −45° C. and stirred for 1 hour at −45° C. The mixture was allowed to warm to room temperature with stirring over a period of 16 hours. To this mixture, H$_2$O (50 mL) was added. The mixture was stirred for 1 hour at room temperature. Isolation of the product yielded 0.7246 g of a white powder. FTIR: observed sharp peak at 3573 cm$^{-1}$ for "free" OH stretch, broad peak around 3460 cm$^{-1}$ for OH stretch and at 1030 cm$^{-1}$ for the C—O stretch. Anal. calcd. for $(C_{10}H_{10})_{0.01}(C_8H_8)_{0.88}(C_{15}H_{20}O)_{0.11}$, C=90.43, H=8.04, O=1.51; Found: C=90.18, H=7.89 O=1.66, Cl=0.00. Functional yield=100%.

Preparation of PS-CH$_2$CH(OH)C$_6$H$_5$

Highly reactive calcium (1.49 mmol) was added to a solution containing chloromethylated polystyrene (0.98 mmol Cl, based on 1.06 mmol Cl/g) in THF (30 mL) and stirred for 6 hours at 0° C. The polymer was filtered and fresh THF (30 mL) was added. Benzaldehyde (4.26 mmol) in THF (10 mL) was added at −45° C. and stirred for 1 hour. The mixture was allowed to warm to room temperature with stirring over a period of 16 hours. At this time, H$_2$O (20 mL) was added and stirred for 1 hour at room temperature. Isolation of the product yielded 0.890 g of a yellow-white powder. FTIR: observed sharp peak at 3642 cm$^{-1}$ for "free" OH stretch, broad peak around 3550–3600 cm$^{-1}$ for the OH stretch and at 1026 cm$^{-1}$ for the C—O stretch. Anal. calcd. for $(C_{10}H_{10})_{0.01}(C_8H_8)_{0.88}(C_{16}H_{16}O)_{0.11}$, C=90.87, H=7.62, O=1.49; Found: C=91.04, H=7.58, O=1.86, Cl=0.00. Functional yield=100%.

Preparation of PS-CH$_2$PPh$_2$

Highly reactive calcium was added to a solution containing chloromethylated polystyrene (1.51 mmol Cl, based on 5.50 mmol Cl/g, DF=0.80) in THF (30 mL) and stirred for 48 hours at room temperature. Chlorodiphenylphosphine (6.03 mmol) in THF (10 mL) was added at 0° C. The mixture was stirred for 1 hour, and was then allowed to warm with stirring to room temperature over a period of 48 hours. Added 3:1 acetone/H$_2$O (20 mL) and stirred for 1 hour at room temperature. Isolation of the product yielded 0.2000 g of a light yellow powder. FTIR: observed weak peaks at 1001, 1452 and 1492 cm$^{-1}$ for P—Ar bonds. Anal. calcd. for $(C_{10}H_{10})_{0.02}(C_8H_8)_{0.18}(C_9H_{10})_{0.48}(C_{21}H_{19}P)_{0.32}$, C=87.11, H=7.21, P=5.66; Found: C=87.25, H=7.15, P=5.34. Functional yield=40%.

Preparation of PS-CH$_2$C$_5$H$_8$(OH)

Highly reactive calcium (1.81 mmol) was added to a solution containing chloromethylated polystyrene (1.19 mmol Cl, based on 1.06 mmol Cl/g) in THF (30 mL) and stirred for 6 hours at 0° C. The polymer was filtered and fresh THF (30 mL) was added. 1,2-Epoxycyclopentane (4.75 mmol) in THF (10 mL) was added at −45° C., and the mixture was stirred for 2 hours at −45° C. It was allowed to warm with stirring to room temperature over a period of 48 hours. To this polymer mixture, H$_2$O (20 mL) was added. It was then stirred for 1 hour at room temperature. Isolation of the product yielded 0.9282 g of an off-white powder. FTIR: observed sharp peak at 3643 cm$^{-1}$ for "free" OH stretch, broad peak around 3400 cm$^{-1}$ for OH stretch and at 1028 cm$^{-1}$ for C—O stretch.

EXAMPLE 5

Preparation of Insoluble Calcium-Substituted Polymeric Reagents From p-Fluoropolystyrene and p-Chloropolystyrene and Reactions Thereof Significantly, the highly reactive calcium species produced according to the method of Example 1 will undergo oxidative addition with 3% cross-linked p-fluoropolystyrene and p-chloropolystyrene to prepare the corresponding calcium-substituted reagents with 100% loss of the halogen after 80 hours at room temperature. The addition of the calcium species to p-fluoropolystyrene and stirring for 48 hours at room temperature resulted in a 71% loss of the directly bonded fluorine. After reacting 48 hours at room temperature, 81% of the directly bonded chlorine was lost from the starting p-chloropolystyrene polymer.

The polymeric calcium-substituted reagent produced from p-fluoropolystyrene was found to react with chlorotrimethylsilane which gave the silylated polymer in a 26% yield (Table V, entry 3). The reaction was stirred for 1 hour at 0° C. and then 16 hours at room temperature. The addition of benzaldehyde to the polymeric calcium-substituted reagent, produced from p-fluoropolystyrene, and subsequent reaction for 96 hours yielded the secondary alcohol in 25% functional yield (Table V, entry 7).

The polymeric calcium-substituted reagent formed from p-chloropolystyrene reacted with chlorotrimethylsilane and gave the functionalized polymer in a 13% yield (Table IV, entry 3). The reaction was stirred for 48 hours at room temperature. The addition of benzaldehyde and subsequent reaction for 96 hours at room temperature gave the secondary alcohol in 16% yield (Table IV, entry 6).

Polymers containing fluorine and chlorine with 1% or 2% cross-linking and lower loadings were not prepared but are expected to produce higher functional yields of the resulting polymers with shorter reaction times.

TABLE IV

Reactions Involving Calcium-Substituted Polymeric Reagents Formed From p-Chloropolystyrene[a] With Highly Reactive Calcium

| Entry | Electrophile | Product | Yield[b] (%) |
|---|---|---|---|
| 1 | H$_2$O | PS—H | 100 |
| 2 | CO$_2$ | PS—COOH | 82[c] |
| 3 | ClSiMe$_3$ | PS—SiMe$_3$ | 13 |
| 4 | C$_6$H$_5$COCl | PS—COC$_6$H$_5$ | 26[d] |
| 5 | CH$_3$COCl | PS—COCH$_3$ | 28[d] |

TABLE IV-continued

Reactions Involving Calcium-Substituted Polymeric
Reagents Formed From p-Chloropolystyrene[a]
With Highly Reactive Calcium

| Entry | Electrophile | Product | Yield[b] (%) |
|---|---|---|---|
| 6 | $C_6H_5CHO$ | $PS-CH(OH)C_6H_5$ | 16 |

[a]p-Chloropolystyrene, 3.75 mmol Cl/g, DF = 0.45, 3% DVB cross-linking.
[b]Elemental analyses.
[c]Titration of COOH groups.
[d]Reaction with CuCN.2LiBr.

TABLE V

Reactions Involving Calcium-Substituted Polymeric
Reagents Formed From p-Fluoropolystyrene[a]
With Highly Reactive Calcium

| Entry | Electrophile | Product | Yield[b] (%) |
|---|---|---|---|
| 1 | $H_2O$ | PS—H | 100 |
| 2 | $CO_2$ | PS—COOH | 78[c] |
| 3 | $ClSiMe_3$ | $PS-SiMe_3$ | 26 |
| 4 | $ClPPh_2$ | $PS-PPh_2$ | 11 |
| 5 | $C_6H_5COCl$ | $PS-COC_6H_5$ | 35[d] |
| 6 | $CH_3COCl$ | $PS-COCH_3$ | 59[d] |
| 7 | $C_6H_5CHO$ | $PS-CH(OH)C_6H_5$ | 25 |

[a]p-Fluoropolystyrene, 2.59 mmol F/g, DF = 0.28, 3% DVB cross-linking.
[b]Elemental analyses.
[c]Titration of COOH groups.
[d]Reaction with CuCN.2LiBr.

Preparation of Functionalized Polymer PS-COOH

From p-fluoropolystyrene: Highly reactive calcium (3.48 mmol) was added to a solution containing p-fluoropolystyrene (1.38 mmol F, based on 2.59 mmol F/g) in THF (30 mL) and stirred for 96 hours at room temperature. Gaseous carbon dioxide was passed through a column of Drierite TM and bubbled into the solution at −45° C. for 2 hours, at 0° C. for 1 hour, and at room temperature for 1 hour. To this reaction mixture, was added 0.5N HCl (15 mL). This was stirred for 30 minutes at room temperature. The polymer was then filtered. Filtered polymer was washed with 0.5N HCl, THF, and MeOH. Drying yielded 0.1474 g of a light gray powder. FTIR: observed peak at 1746 cm$^{-1}$ for the carboxyl group and disappearance of aryl fluoride at 1230 cm$^{-1}$. Aryl fluorides absorb in the 1250-1210 cm$^{-1}$ region and monofluorinated benzenes display a strong absorption band near 1230 cm$^{-1}$. See R. M. Silverstein et al., *Spectrometric Identification of Organic Compounds*, Wiley and Sons: New York, 1981, Fourth edition. Acid-base titrations yielded 2.02 mmol COOH/g or 78% functional yield. Anal. Found: F=0.00.

From p-chloropolystyrene: Highly reactive calcium (3.72 mmol) was added to a solution containing p-chloropolystyrene (1.46 mmol Cl, based on 3.75 mmol Cl/g) in THF (30 mL) and stirred for 96 hours at room temperature. Gaseous carbon dioxide was passed through a column of Drierite TM and bubbled into the solution at −45° C. for 2 hours, at 0° C. for 1 hour, and at room temperature for 1 hour. To this was added 1.0N HCl (20 mL). The mixture was stirred for 30 minutes at room temperature. Isolation of the product yielded 0.3002 g of a light gray powder. FTIR: observed peak at 1742 cm$^{-1}$ for the carboxyl group and the disappearance of aryl chloride at 1090 cm$^{-1}$. Chlorobenzenes absorb in the 1096-1089 cm$^{-1}$ region. See R. M. Silverstein et al., *Spectrometric Identification of Organic Compounds*, Wiley and Sons: New York, 1981, Fourth edition. Acid-base titrations yielded 3.07 mmol COOH/g or 82% functional yield. Anal. Found: Cl=0.00.

Preparation of Functionalized Polymer PS-SiMe$_3$

From p-fluoropolystyrene: Highly reactive calcium (3.08 mmol) was added to a solution containing p-fluoropolystyrene (2.05 mmol F) in THF (30 mL) and stirred for 120 hours at room temperature. The polymer was filtered, fresh THF (30 mL) added, and the mixture was cooled to 0° C. Chlorotrimethylsilane (4.32 mmol) in THF (10 mL) was added at 0° C. and stirred for 1 hour. The mixture was allowed to warm from 0° C. with stirring to room temperature over a period of 16 hours. Isolation of the product yielded 1.3461 g of a white powder. FTIR: observed peaks at 1249 and 756 cm$^{-1}$ for the Si—C bonds. Anal. calcd. for $(C_{10}H_{10})_{0.03}(C_8H_8)_{0.897}(C_{11}H_{16}Si)_{0.073}$, Si=1.86; Found: Si=1.66. Functional yield=26%.

From p-chloropolystyrene: Highly reactive calcium (2.80 mmol) was added to a solution containing p-chloropolystyrene (1.89 mmol Cl) in THF (30 mL) and stirred for 96 hours at room temperature. The polymer was filtered, fresh THF (30 mL) was added, and the mixture was cooled to −78° C. Chlorotrimethylsilane (6.94 mmol) in THF (10 mL) was added at −78° C., and the mixture was stirred at −78° C. for 2 hours. It was allowed to warm with stirring to room temperature over a period of 48 hours. Isolation of the product yielded 0.4517 g of a yellow-white powder. FTIR: observed peaks at 1250 and 756 cm$^{-1}$ for Si—C bonds. Anal. calcd. for $(C_{10}H_{10})_{0.03}(C_8H_8)_{0.912}(C_{11}H_{16}Si)_{0.058}$, Si=1.50; Found: Si=1.22. Functional yield=13%.

Preparation of Functionalized Polymer PS-PPh$_2$

From p-fluoropolystyrene: Highly reactive calcium (1.95 mmol) was added to a solution containing p-fluoropolystyrene (1.31 mmol F) in THF (30 mL) at −78° C. The mixture was stirred for 1 hour at −78° C., and then allowed to warm to room temperature over a period of 90 hours. The polymer was filtered, fresh THF (30 mL) added, and the mixture was cooled to −78° C. Chlorodiphenylphosphine (4.10 mmol) in THF (10 mL) was added at −78° C. and stirred for 1 hour. The mixture was then allowed to warm with stirring to room temperature over a period of 48 hours. Isolation of the product yielded 0.4788 g of a light yellow powder. FTIR: observed peaks at 1003 and 1492 cm$^{-1}$ for P—Ar bonds. Anal. calcd. for $(C_{10}H_{10})_{0.03}(C_8H_8)_{0.939}(C_{20}H_{17}P)_{0.031}$, P=0.87; Found: 0.60. Functional yield=11%.

Preparation of Functionalized Polymer PS-CH(OH)C$_6$H$_5$

From p-fluoropolystyrene: Highly reactive calcium (2.61 mmol) was added to a solution containing p-fluoropolystyrene (1.71 mmol F) in THF (30 mL) at −45° C. and stirred for 4 hours. The mixture was allowed to warm with stirring to room temperature over a period of 96 hours. The polymer was filtered, fresh THF (30 mL) was added, and the mixture was cooled to −45° C. Benzaldehyde (4.59 mmol) in THF (10 mL) was added at −45° C. The mixture was stirred for 4 hours at −45° C., and then allowed to warm to room temperature over a period of 96 hours. Deionized $H_2O$ (20 mL) was added at room temperature and stirred for 24 hours. Isolation of the product yielded 0.3415 g of a yellowish-white powder. FTIR: observed sharp peak at 3650 cm$^{-1}$ for "free" OH stretch, broad peak at 3400-3600 cm$^{-1}$ for OH stretch and C—O stretch at 1028 cm$^{-1}$. Anal. calcd. for $(C_{10}H_{10})_{0.03}(C_8H_8)_{0.90}(C_{15}H_{14}O)_{0.07}$, C=91.39, H=7.60, O=1.00; Found: C=91.15, H=7.46, O=0.85. Functional Yield=25%.

From p-chloropolystyrene: Highly reactive calcium (3.45 mmol) was added to a solution containing p-chloropolystyrene (2.32 mmol Cl) in THF (30 mL) at −45° C. and stirred for 4 hours at −45° C. The mixture was allowed to warm to room temperature with stirring over a period of 96 hours. The calcium-substituted polymer was filtered. Fresh THF (30 mL) was added to the polymer. The mixture was then cooled to −45° C. Benzaldehyde (4.03 mmol) in THF (10 mL) was added at −45° C. The mixture was stirred for 4 hours at −45° C. It was then allowed to warm to room temperature over a period of 96 hours. Deionized H2O (8 mL) was added and the mixture was stirred for 20 minutes at room temperature. Isolation of the product yielded 1.2791 g of a white powder. FTIR: observed sharp peak at 3650 cm$^{-1}$ for "free" OH stretch, broad peak around 3400–3600 cm$^{-1}$ or OH stretch and C—O stretch at 1028 cm$^{-1}$. Anal. calcd. for $(C_{10}H_{10})_{0.03}(C_8H_8)_{0.898}(C_{15}H_{14}O)_{0.072}$, C=90.35, H=7.62; O=1.03. Found: C=90.95, H=7.61; O=0.75. Functional Yield=16%.

Preparation of Functionalized Polymer PS-COC6H5

From p-fluoropolystyrene: Highly reactive calcium (3.52 mmol) was added to a solution containing p-fluoropolystyrene (2.33 mmol F) in THF (30 mL) at −45° C. The mixture was gradually warmed with stirring to room temperature over a period of 96 hours. The polymer was filtered, fresh THF (30 mL) was added, and the mixture was then cooled to −45° C. CuCN (3 68 mmol) and LiBr (7.25 mmol) in THF (10 mL) were added to the mixture at −45° C. The mixture was then stirred for 2 hours at −45° C. Benzoyl chloride (5.63 mmol) in THF (10 mL) was added at −45° C. and stirred for 2 hours at −45° C. with warming to room temperature for 48 hours. Isolation of the product yielded 0.7863 g of a light yellow powder. FTIR: observed peak at 1660 cm$^{-1}$ for the carbonyl. Anal. calcd. for $(C_{10}H_{10})_{0.03}(C_8H_8)_{0.872}(C_{15}H_{12}O)_{0.098}$, C=91.24, H=7.40, O=1.36; Found: C=91.27, H=7.58, O=1.03, F=0.00. Functional yield=35%.

From p-chloropolystyrene: Highly reactive calcium (3.69 mmol) was added to a solution containing p-chloropolystyrene (2.48 mmol Cl) in THF (30 mL) at −45° C. and gradually warmed with stirring to room temperature over a period of 96 hours. The polymer was filtered, fresh THF (30 mL) was added, and the mixture was cooled to −45° C. To this mixture, CuCN (3.89 mmol) and LiBr (7.69 mmol) in THF (10 mL) were added at −45° C. The mixture was stirred for 2 hours at −45° C. Benzoyl chloride (5.70 mmol) in THF (10 mL) was then added to the mixture, which was stirred for an additional 2 hours at −45° C. The mixture was then warmed to room temperature over a period of 48 hours. Isolation of the product yielded 0.5922 g of a light yellow powder. FTIR: observed peak at 1660 cm$^{-1}$ for the carbonyl. Anal. calcd. for $(C_{10}H_{10})_{0.03}(C_8H_8)_{0.853}(C_{15}H_{12}O)_{0.117}$, C=91.06, H=7.34, O=1.60; Found: C=90.46, H=7.71, O=1.20, Cl=0.00. Functional yield=26%.

Preparation of Functionalized Polymer PS-COCH3

From p-fluoropolystyrene: Highly reactive calcium (1.72 mmol) was added to a solution containing p-fluoropolystyrene (1.13 mmol F) in THF (30 mL) at −78° C. The mixture was then stirred for 1 hour at −78° C., and allowed to warm to room temperature over a period of 80 hours. The polymer was filtered, fresh THF (30 mL) was added, and the reaction mixture was cooled to −45° C. To this mixture, CuCN (1.49 mmol) and LiBr (3.12 mmol) in THF (10 mL) were added. The entire mixture was stirred for 4 hours at −45° C. Acetyl chloride (6.49 mmol) in THF (10 mL) was then added at −45° C. with additional stirring for 4 hours. The mixture was allowed to warm from −45° C. to room temperature. It was then stirred for an additional 48 hours. Isolation of the product yielded 0.2949 g of a light gray powder. FTIR: observed a peak at 1685 cm$^{-1}$ for the carbonyl. Anal. calcd. for $(C_{10}H_{10})_{0.03}(C_8H_8)_{0.805}(C_{10}H_{10}O)_{0.165}$, C=90.08, H=7.56, O=2.35; Found: C=90.14, H=7.53, O=2.27. Functional yield=59%.

From p-chloropolystyrene: Highly reactive calcium (2.18 mmol) was added to a solution containing p-chloropolystyrene (1.43 mmol Cl) in THF (30 mL) at −78° C. and stirred for 1 hour. The mixture was allowed to warm from −78° C. to room temperature with stirring over a period of 80 hours. The polymer was filtered, fresh THF (30 mL) was added, and the mixture was cooled to −45° C. CuCN (1.52 mmol) and LiBr (3.14 mmol) in THF (10 mL) were added to this mixture at −45° C., and stirred for an additional 4 hours. Acetyl chloride (4.40 mmol) in THF (10 mL) was added at −45° C. and stirred for 4 hours. The mixture was then warmed from −45° C. to room temperature with stirring over a period of 48 hours. Isolation of the product yielded 0.1723 g of a light gray powder. FTIR: observed peak at 1682 cm$^{-1}$ for the carbonyl. Anal. calcd. for $(C_{10}H_{10})_{0.03}(C_8H_8)_{0.844}(C_{10}H_{10}O)_{0.126}$, C=90.57, H=7.60, O=1.83; Found: C=88.55, H=7.56, O=1.60. Functional yield=28%.

EXAMPLE 6

Preparation and Reactions of Calcium-Substituted Polymeric Cuprate Reagents From p-Bromopolystyrene Addition of a copper(I) salt to the calcium-substituted reagent resulted in a new reagent of vastly different chemical reactivity. Table VI and Table VII present some of the reactions of the calcium-substituted polymeric cuprate reagents with various electrophiles.

A soluble copper(I) complex, CuCN.2LiBr was used for the reactions with the calcium-substituted reagents to prepare the copper calcium reagents. The CuCN.2LiBr can be prepared from CuCN and LiBr in THF, as outlined in P. Knochel et al., *J. Org. Chem.*, 53, 2390 (1988), which is incorporated herein by reference. Reaction of the calcium-substituted polymeric reagent, after removal of excess highly reactive calcium, with 1.05–1.10 equivalents of CuCN.2LiBr (based on starting halide) proceeded at −45° C. for 2 hours. The calcium-substituted cuprate formed from p-bromopolystyrene (DF=0.31) was reacted with benzoyl chloride at −45° C. with warming to room temperature. This afforded the ketone-containing polymer (Table VI, entry 1) in a 90% functional yield as evidenced by elemental analyses. FTIR, high resolution EI-MS, and elemental analyses were used to characterize the polymer. Reaction of the calcium-substituted reagent with benzoyl chloride and no reaction with CuCN.2LiBr also resulted in a 70% yield of the ketone product.

Reaction of acetyl chloride with the calcium cuprate reagent gave the ketone-containing polymer (Table VI, entry 3) in a quantitative yield. When the reaction was carried out in one pot without filtration of the excess highly reactive calcium and 0.74 equivalents of CuCN.2LiBr, the ketone product was formed in a 76% yield. Reaction of the calcium cuprate reagent with a functionalized alkyl halide, ethyl 4-bromobutyrate, gave the ester functionalized polymer (Table VI, entry 5) in a 60% yield. Without reaction with CuCN.2LiBr, the product was formed in only 40% with 3% of the bromine-containing polymer found.

In addition, these calcium cuprate reagents undergo conjugate 1,4-addition with $\alpha,\beta$-unsaturated ketones. Reaction of the calcium cuprate reagent with 2-cyclohexen-1-one afforded the conjugate addition product in 90% yield (Table VI, entry 6). The FTIR spectrum of the product showed the presence of a strong peak in the 1709-11 $cm^{-1}$ region for the carbonyl and the absence of the aryl bromide precursor at 1408, 1072, 1010, and 718 $cm^{-1}$. The same reaction was carried out, with filtration of the polymer after the formation of the calcium cuprate, and 2-cyclohexen-1-one was added. This gave the ketone product in 45% functional yield.

TABLE VI

Reactions of Polymeric Calcium-Substituted Cuprates[a] From p-Bromopolystyrene[b] with Various Electrophiles

| Entry | Electrophile | Product | Yield[c] (%) |
|---|---|---|---|
| 1 | $C_6H_5COCl$ | PS—$COC_6H_5$ | 90 |
| 2 | p-$ClC_6H_5COCl$ | PS—$COC_6H_5$(p-Cl) | 38 |
| 3 | $CH_3COCl$ | PS-$COCH_3$ | 100 |
| 4 | Br$(CH_2)_3$CN | PS—$(CH_2)_3$CN | 23 |
| 5 | Br$(CH_2)_3CO_2$Et | PS—$(CH_2)_3CO_2$Et | 60 |
| 6 | $C_6H_8O$[d] | PS—$C_6H_9O$ | 90 |

[a]Reaction with CuCN.2LiBr.
[b]p-Bromopolystyrene, 2.44 mmol Br/g, DF = 0.31, 2% DVB cross-linking.
[c]Elemental analyses.
[d]2-Cyclohexen-1-one.

Preparation of PS-$COC_6H_5$ Using CuCN.2LiBr

Highly reactive calcium (1.95 mmol) was added to a solution containing p-bromopolystyrene (1.29 mmol Br, based on 2.44 mmol Br/g, DF=0.31) in THF (30 mL) and stirred for 36 hours at room temperature. The polymer was filtered and fresh THF (30 mL) was added and cooled to $-45°$ C. CuCN (1.40 mmol) and LiBr (3.09 mmol) in THF (10 mL) were pre-cooled to $-45°$ C. and added to the polymer solution. The polymer was stirred for 2 hours at $-45°$ C. at which time benzoyl chloride (4.94 mmol) in THF (10 mL) was added and stirred for 1 hour at $-45°$ C. with warming to room temperature over a period of 48 hours. Isolation of the product yielded 0.3918 g of a tan powder. FTIR: peak observed at 1663 $cm^{-1}$ for the carbonyl and the absence of peaks at 1408, 1072, 1010, and 718 $cm^{-1}$ for the aryl bromide precursor. HR EI-MS yielded fragments at 105.0341 m/e for $C_7H_5O^+$ (21.65%), 130.0783 m/e for $C_{10}H_{10}^+$ (3.48%), and at 104.0623 m/e for $C_8H_8^+$ (100%). Anal. calcd. for $(C_{10}H_{10})_{0.02}(C_8H_8)_{0.701}(C_{15}H_{12}O)_{0.279}$, C=89.76, H=6.90, O=3.33; Found: C=89.38, H=7.46, O=3.24, Br=0.00. Functional yield=90%.

Preparation of PS-$COC_6H_5$(p-Cl) Using CuCN.LiBr

Highly reactive calcium (3.60 mmol) was added to a solution containing p-bromopolystyrene (1.39 mmol Br) in THF (30 mL) and stirred for 48 hours at room temperature. CuCN (2.62 mmol) and LiBr (4.86 mmol) in THF (10 mL) were pre-cooled to $-45°$ C., added to the polymer solution, and stirred for 2 hours at $-45°$ C. 4-Chlorobenzoyl chloride (7.15 mmol) in THF (10 mL) was added and stirred for 2 hours at $-45°$ C. with warming to room temperature over a period of 41 hours. Isolation of the product yielded 0.5409 g of a light tan powder. FTIR: observed peak at 1660 $cm^{-1}$ for carbonyl and at 1090 $cm^{-1}$ for the aryl chloride. Anal. calcd. for $(C_{10}H_{10})_{0.02}(C_8H_8)_{0.862}(C_{15}H_{11}OCl)_{0.118}$, Cl=3.45; Found: Cl=3.37, Br=0.00. Functional yield=38%.

Preparation of PS-$COCH_3$ Using CuCN.LiBr

Highly reactive calcium (2.04 mmol) was added to a solution containing p-bromopolystyrene (1.34 mmol Br) in THF (30 mL) and stirred for 36 hours at room temperature. The polymer was filtered, fresh THF (30 mL) was added, and the mixture was cooled to $-45°$ C. CuCN (1.58 mmol) and LiBr (3.28 mmol) in THF (10 mL) were pre-cooled to $-45°$ C. and added to the polymer. The polymer was stirred for 2 hours at $-45°$ C. at which time acetyl chloride (4.70 mmol) in THF (10 mL) was added and stirred for 1 hour at $-45°$ C. with warming to room temperature over a period of 48 hours. Isolation of the product yielded 0.3514 g of a tan powder. FTIR: observed peak at 1686 $cm^{-1}$ for the carbonyl. Anal. calcd. for $(C_{10}H_{10})_{0.02}(C_8H_8)_{0.67}(C_{10}H_{10}O)_{0.31}$, C=88.37, H=7.41, O=4.21; Found: C=88.54, H=7.79, O=4.33, Br=0.00. Functional yield=100%.

Preparation of PS-$(CH_2)_3$CN Using CuCN.2LiBr

Highly reactive calcium (1.95 mmol) was added to a solution containing p-bromopolystyrene (1.29 mmol Br) in THF (30 mL) and stirred for 48 hours at room temperature. The polymer was filtered, fresh THF (30 mL) was added, and the mixture was cooled to $-45°$ C. CuCN (1.51 mmol) and LiBr (3.38 mmol) in THF (10 mL) were pre-cooled to $-45°$ C., added to the polymer and stirred for 2 hours at $-45°$ C. 4-Bromobutyronitrile (4.05 mmol) in THF (10 mL) was added at $-45°$ C., stirred for 1 hour at $-45°$ C. and warmed to room temperature over a period of 48 hours. Isolation of the product yielded 0.2957 g of a yellow-tan powder. FTIR: observed peak at 2247 $cm^{-1}$ for the nitrile. Anal. calcd. for $(C_{10}H_{10})_{0.02}(C_8H_8)_{0.91}(C_{12}H_{13}N)_{0.07}$, N=0.91; Found: N=0.80, Br=0.00. Functional yield=23%.

Preparation of PS-$(CH_2)_3CO_2$Et Using CuCN.2LiBr

Highly reactive calcium (2.96 mmol) was added to a solution containing p-bromopolystyrene (1.18 mmol Br) in THF (30 mL) and stirred for 48 hours at room temperature. The solution was cooled to $-45°$ C. at which time CuCN (1.91 mmol) and LiBr (4.04 mmol) in THF (10 mL) were added and stirred for 2 hours at $-45°$ C. Ethyl 4-bromobutyrate (6.34 mmol) in THF (10 mL) was added at $-45°$ C., stirred for 2 hours at $-45°$ C. and warmed to room temperature over a period of 68 hours. Isolation of the product yielded 0.3701 g of a tan powder. FTIR: peak observed at 1736 $cm^{-1}$ for the ester carbonyl and at 1183 $cm^{-1}$ for the C—O stretch. Anal. calcd. for $(C_{10}H_{10})_{0.02}(C_8H_8)_{0.794}(C_{14}H_{18}O_2)_{0.186}$, C=87.34, H=7.92, O=4.73; Found: C=87.73, H=7.45, O=4.88, Br=0.00. Functional yield=60%.

Preparation of PS-$C_6H_9O$ Using CuCN.2LiBr

Highly reactive calcium (1.32 mmol) was added to a solution containing p-bromopolystyrene (0.90 mmol Br)

in THF (30 mL) and stirred for 48 hours at room temperature. The polymer was filtered, fresh THF (30 mL) was added, and the mixture was cooled to −45° C. CuCN (1.42 mmol) and LiBr (2.80 mmol) in THF (10 mL) were added at −45° C. and stirred for 2 hours at −45° C. 2-Cyclohexen-1-one (2.50 mmol) in THF (10 mL) was added at −45° C. and stirred for 2 hours at −45° C. with warming to room temperature over a period of 24 hours. The polymer was quenched with 3N HCl (8 mL) and stirred for 20 minutes. Isolation of the product yielded 0.3059 g of a tan powder. FTIR: observed a peak at 1709 cm$^{-1}$ for the carbonyl. Anal. calcd. for $(C_{10}H_{10})_{0.02}(C_8H_8)_{0.701}(C_{14}H_{16}O)_{0.279}$, C=88.73, H=7.87, O=3.39; Found: C=88.40, H=7.72, O=3.13, Br=0.00. Functional yield=90%.

EXAMPLE 7

Preparation and Reactions of Calcium-Substituted Polymeric Cuprate Reagents From Chloromethylated Polystyrene The calcium-substituted reagent prepared from highly reactive calcium and chloromethylated polystyrene (DF=0.11) was also reacted with CuCN.2LiBr at −45° C. for 2 hours to generate the benzylic calcium cuprate reagent. Addition of benzoyl chloride at −45° C. with warming to room temperature yielded the ketone-containing polymer in a quantitative yield (Table VII, entry 1). Without reaction with CuCN.2LiBr, only a 60% yield of the ketone polymer was obtained. The calcium cuprate formed from the higher functionalized chloromethylated polystyrene (5.50 mmol Cl/g, DF=0.80, 2% DVB cross-linking) was reacted with benzoyl chloride and afforded the ketone product in a 61% yield. Reaction of the calcium-substituted reagent from chloromethylated polystyrene, which was stored for 1 month under inert atmosphere conditions at room temperature, with CuCN.2LiBr followed by reaction with benzoyl chloride afforded the ketone product in a 95% yield.

As with p-bromopolystyrene, this new chemical reactivity of the calcium cuprate reagent with 2-cyclohexen-1-one afforded the conjugate addition product in a quantitative yield (Table VII, entry 5). The FTIR spectrum of the product yielded an intense peak for the carbonyl in the 1709-11 cm$^{-1}$ region with loss of the chloromethyl peak at 1266 cm$^{-1}$.

The calcium-substituted reagents formed from p-chloropolystyrene and p-fluoropolystyrene underwent reaction with CuCN.2LiBr at −45° C. for 4 hours to prepare the calcium cuprate reagent. Addition of acetyl chloride afforded the ketone products in 28% and 59% yields, respectively (Table IV, entry 5 and Table V, entry 6). The FTIR spectra showed the presence of a strong peak around 1682-85 cm$^{-1}$ for the carbonyl of both polymers and the absence of the aryl fluoride and chloride precursors at 1230 and 1090 cm$^{-1}$, respectively.

TABLE VII

Reactions of Polymeric Calcium-Substituted Cuprates[a]
From Chloromethylated Polystyrene[b]
With Various Electrophiles

| Entry | Electrophile | Product | Yield[c] (%) |
|---|---|---|---|
| 1 | $C_6H_5COCl$ | PS—$CH_2COC_6H_5$ | 100 |
| 2 | $CH_3COCl$ | PS—$CH_2COCH_3$ | 100 |
| 3 | $Br(CH_2)_3CN$ | PS$(CH_2)_4CN$ | 37 |
| 4 | $Br(CH_2)_3CO_2Et$ | PS—$(CH_2)_4CO_2Et$ | 80 |
| 5 | $C_6H_8O$[d] | PS—$CH_2C_6H_9O$ | 100 |

[a]Reaction with CuCN.2LiBr.
[b]Chloromethylated polystyrene, 1.06 mmol Cl/g, DF = 0.11, 1% DVB cross-linking.
[c]Elemental analyses.
[d]2-Cyclohexen-1-one.

Preparation of PS-$CH_2COC_6H_5$ Using CuCN.2LiBr

Highly reactive calcium (1.44 mmol) was added to a solution containing chloromethylated polystyrene (0.58 mmol Cl, based on 1.06 mmol Cl/g, DF=0.11) in THF (30 mL) and stirred at room temperature for 40 hours. CuCN (0.86 mmol) and LiBr (1.69 mmol) in THF (10 mL) were added at −42° C. and stirred for 2 hours at −42° C. Benzoyl chloride (2.26 mmol) in THF (10 mL) was added at −42° C., stirred for 2 hours at −42° C. and warmed to room temperature over a period of 48 hours. Isolation of the product yielded 0.5125 g of a light gray powder. FTIR: observed a peak at 1682 cm$^{-1}$ for the carbonyl and disappearance of the chloride precursor at 1266 cm$^{-1}$. Anal. calcd. for $(C_{10}H_{10})_{0.01}(C_8H_8)_{0.88}(C_{16}H_{14}O)_{0.11}$, C=91.05, H=7.45, O=1.50; Found: C=91.40, H=7.29, O=1.18, Cl=0.00. Functional yield=100%.

Preparation of PS-$CH_2COCH_3$ Using CuCN.2LiBr

Highly reactive calcium (0.97 mmol) was added to a solution containing chloromethylated polystyrene (0.65 mmol Cl) in THF (30 mL) and stirred for 6 hours at 0° C. The polymer was filtered, fresh THF (30 mL) was added, and the mixture was cooled to −45° C. CuCN (0.85 mmol) and LiBr (1.59 mmol) in THF (10 mL) were added at −45° C. The mixture was stirred for 2 hours at −45° C. Acetyl chloride (2.53 mmol) in THF (10 mL) was added at −45° C., stirred for 1 hour at −45° C., and warmed to room temperature for 18 hours. Isolation of the product yielded 0.5809 g of a light gray powder. FTIR: observed peak at 1713 cm$^{-1}$ for the carbonyl. Anal. calcd. for $(C_{10}H_{10})_{0.01}(C_8H_8)_{0.88}(C_{11}H_{12}O)_{0.11}$, C=90.70, H=7.80, O=1.59; Found: C=90.85, H=7.77, O=1.94, Cl=0.00. Functional yield=100%.

Preparation of PS-$(CH_2)_4CN$ Using CuCN.2LiBr

Highly reactive calcium (0.97 mmol) was added to a solution containing chloromethylated polystyrene (0.61 mmol Cl) in THF (30 mL) and stirred for 6 hours at 0° C. The polymer was filtered, fresh THF (30 mL) was added, and the mixture was cooled to −45° C. CuCN (1.04 mmol) and LiBr (2.37 mmol) in THF (10 mL) were added at −45° C. The mixture was stirred for 2 hours at −45° C. 4-Bromobutyronitrile (1.65 mmol) in THF (10 mL) was added at −45° C., stirred for 1 hour at −45° C., and the mixture was warmed to room temperature over a period of 18 hours. Isolation of the product yielded 0.2650 g of a dark powder. FTIR: observed a peak at 2250 cm$^{-1}$ for the nitrile. Anal. calcd. for $(C_{10}H_{10})_{0.01}(C_8H_8)_{0.88}(C_9H_{10})_{0.069}(C_{13}H_{15}N)_{0.041}$, N=0.52; Found: N=0.50, Cl=0.00. Functional yield=37%.

Preparation of PS-(CH$_2$)$_4$CO$_2$Et Using CuCN.2LiBr the silylated product (Table VIII, entry 2) in 36% yield; however, this yield was not optimized.

TABLE VIII

| Entry | Polymer | Electrophile | Product | Yield$^a$ (%) |
|---|---|---|---|---|
| | | Bifunctionalization of Polymers Utilizing Highly Reactive Calcium | | |
| 1 | PS—COC$_6$H$_4$(p-Cl)$^b$ | ClSiMe$_3$ | PS—COC$_6$H$_4$SiMe$_3$ | 60 |
| 2 | PS—CH$_2$COC$_6$H$_4$(p-Br)$^c$ | ClSiMe$_3$ | PS—CH$_2$COC$_6$H$_4$SiMe$_3$ | 36 |
| 3 | PS—COC$_6$H$_4$(p-Cl)$^b$ | ClPPh$_2$ | PS—COC$_6$H$_4$PPh$_2$ | 10 |

$^a$Elemental analyses.
$^b$Based on 0.93 mmol Cl/g.
$^c$Based on 0.77 mmol Br/g.

Highly reactive calcium (0.93 mmol) was added to a solution containing chloromethylated polystyrene (0.60 mmol Cl) in THF (30 mL) and stirred for 6 hours at 0° C. The polymer was filtered, fresh THF (30 mL) was added, and the mixture was cooled to −45° C. CuCN (0.99 mmol) and LiBr (2.29 mmol) in THF (10 mL) were added at −45° C. and stirred for 2 hours at −45° C. Ethyl 4-bromobutyrate (1.61 mmol) in THF (10 mL) was added at −45° C. The mixture was stirred for 2 hours at −45° C., and then warmed to room temperature with stirring over a period of 18 hours. Isolation of the product yielded 0.4072 g of a yellow powder. FTIR: observed a peak at 1742 cm$^{-1}$ for the ester carbonyl and at 1184 cm$^{-1}$ for the C—O stretch. Anal. calcd. for (C$_{10}$H$_{10}$)$_{0.01}$(C$_8$H$_8$)$_{0.88}$(C$_9$H$_{10}$)$_{0.022}$(C$_{15}$H$_{20}$O$_2$)$_{0.088}$, C=89.64, H=7.90, O=2.43; Found: C=89.15, H=7.70, O=2.39, Cl=0.00. Functional yield=80%.

Preparation of PS-CH$_2$C$_6$H$_9$O Using CuCN.2LiBr

Highly reactive calcium (0.84 mmol) was added to a solution containing chloromethylated polystyrene (0.56 mmol Cl) in THF (30 mL) at 0° C. for 6 hours. The polymer was filtered, fresh THF (30 mL) was added, and the mixture was cooled to −45° C. CuCN (0.88 mmol) and LiBr (1.88 mmol) in THF (10 mL) were added at −45° C., and the mixture was stirred for 2 hours at 145° C. 2-Cyclohexen-l-one (1.55 mmol) in THF (10 mL) was added at −45° C. and stirred for 2 hours with warming to room temperature over a period of 24 hours. The polymer was quenched with 3N HCl (8 mL) and stirred for 20 minutes. Isolation of the product yielded 0.4716 g of a light brown powder. FTIR: observed peak at 1709 cm$^{-1}$ for the carbonyl. Anal. calcd. for (C$_{10}$H$_{10}$)$_{0.01}$(C$_8$H$_8$)$_{0.88}$(C$_{15}$H$_{18}$O)$_{0.11}$, C=90.69, H=7.80, O=1.51; Found: C=90.44, H=7.87, O=1.33, Cl=0.00. Functional Yield=100%.

EXAMPLE 8

Preparation of Bifunctional Polymers Utilizing Highly Reactive Calcium

The addition of highly reactive calcium to a chlorine-containing polymer, previously functionalized by the electrophile p-ClC$_6$H$_5$COCl, and subsequent addition of chlorotrimethylsilane afforded the silylated product (Table VIII, entry 1 ) in a 60% yield. The FTIR spectrum of the polymer showed the presence of peaks at 1251 and 758 cm$^{-1}$ for the Si—C bonds and at 1664 cm$^{-1}$ for the carbonyl. Elemental analysis of the product confirmed the complete loss of the chlorine from the polymer. High resolution EI-MS yielded fragments at 73.0485 m/e for C$_3$H$_9$Si$^+$, 181.0648 m/e for C$_{13}$H$_9$O$^+$ and at 105.0337 m/e for C$_7$H$_5$O$^+$. The addition of highly reactive calcium to a bromine-containing polymer and reaction with chlorotrimethylsilane gave the silylated product (Table VIII, entry 2) in 36% yield; however, this yield was not optimized.

Preparation of PS-COC$_6$H$_4$SiMe$_3$

Highly reactive calcium (0.46 mmol) was added to a solution containing PS-COC$_6$H$_5$(p-Cl) (0.14 mmol Cl based on 0.93 mmol Cl/g) in THF (30 mL) at room temperature and stirred for 72 hours. Chlorotrimethylsilane (5.43 mmol) in THF (10 mL) was added at room temperature and stirred for 48 hours. To this was added 1:1 H$_2$O/5% HCl (25 mL). The mixture was stirred for 1 hour at room temperature. Isolation of the product yielded 0.0868 g of a tan powder. FTIR: observed peaks at 1251 and 758 cm$^{-1}$ for the Si—C bonds and 1664 cm$^{-1}$ for the carbonyl. Absence of aryl chloride precursor at 1090 cm$^{-1}$. HR EI-MS yielded fragments at 73.0485 m/e for C$_3$H$_9$Si$^+$ (8.14%), 105.0337 m/e for C$_7$H$_5$O$^+$ (31.82%), 181.0648 for C$_{13}$H$_9$O$^+$ (4.50%), and at 104.0662 m/e for C$_8$H$_8^+$ (73.82%). Anal. calcd. for (C$_{10}$H$_{10}$)$_{0.02}$(C$_8$H$_8$)$_{0.862}$(C$_{15}$H$_{12}$O)$_{0.047}$(C$_{18}$H$_{20}$OSi)$_{0.071}$, Si=1.63; Found: Si=1.56, Cl=0.00. Functional yield=60%.

Preparation of PS-CH$_2$COC$_6$H$_4$SiMe$_3$

Highly reactive calcium (0.44 mmol) was added to a solution containing PS-CH$_2$COC$_6$H$_4$(p-Br) (0.09 mmol Br, based on 0.77 mmol Br/g) in THF (30 mL) at room temperature and stirred for 48 hours at room temperature. Chlorotrimethylsilane (5.44 mmol) in THF (10 mL) was added, and the mixture was stirred at room temperature for 48 hours. Isolation of the product yielded 0.0929 g of a yellow-gray powder. FTIR: observed peaks at 1267 and 758 cm$^{-1}$ for the Si—C bonds and 1687 cm$^{-1}$ for the carbonyl. HR EI-MS yielded fragments at 73.0488 m/e for C$_3$H$_9$Si$^+$ (5.96%), 105.0345 m/e for C$_7$H$_5$O$^+$ (13.67%), at 178.0781 m/e for C$_{14}$H$_{10}$O$^+$ (3.12%), at 130.0775 m/e for C$_{10}$H$_{10}^+$ (2.63%), and at 104.0628 m/e for C$_8$H$_8^+$ (9.56%). Anal. Calcd. for (C$_{10}$H$_{10}$)$_{0.02}$(C$_8$H$_8$)$_{0.18}$(C$_9$H$_{10}$)$_{0.69}$(C$_{16}$H$_{13}$OBr)$_{0.053}$(C$_{16}$H$_{14}$O)$_{0.017}$(C$_{19}$H$_{22}$OSi)$_{0.040}$, Si=0.83; Found: Si=0.77, Br=3.03 (48% Br remaining). Functional yield=36%.

Preparation of PS-COC$_6$H$_4$PPh$_2$

Highly reactive calcium (0.57 mmol) was added to a solution containing PS-COC$_6$H$_4$(p-Cl) (0.18 mmol Cl, based on 0.93 mmol Cl/g) in THF (30 mL) at room temperature. The mixture was stirred for 72 hours at room temperature. Chlorodiphenylphosphine (5.86 mmol) in THF (10 mL) was added, and the mixture was stirred for 1 hour at 0° C. The mixture was then warmed over a period of 48 hours. Isolation of the product yielded 0.050 g of a tan powder. FTIR: observed a peak at 1665 cm$^{-1}$ for the carbonyl and weak peak at 1452 cm$^{-1}$ for the P—Ar bond. Anal. calcd. for (C$_{10}$H$_{10}$)$_{0.02}$(C$_8$H$_8$)$_{0.862}$(C$_{15}$H$_{12}$O)$_{0.106}$(C$_{27}$H$_{21}$O)$_{0.012}$, P=0.31; Found: P=0.25, Cl=0.00. Functional yield=10%.

EXAMPLE 9

Isolation of Intermediates

Isolation of the calcium-substituted cuprates, formed from p-bromopolystyrene and chloromethylated polystyrene, gave dark brown solids under inert atmosphere conditions. The isolation was carried out using Schlenk glassware and done at −45° C. with gradual warming to room temperature. Exposure of the solids to air yielded light brown to blue-green colored solids. Elemental analyses of the solids, under an inert atmosphere, showed the presence of copper and nitrogen but not calcium (within detection limits of 0.20%). From the analyses of the polymers, we were unable to quantitatively account for all elements. These results suggest that the calcium can be removed by filtration and washing from the polymer, and that the copper is bound to a carbon on the polymer. The calcium may be in equilibrium with, or loosely coordinated with, the copper reagent. The calcium enhances the reactivity of the organocopper reagent in subsequent reactions with electrophiles.

Calcium-Substituted Reagent From p-Bromopolystyrene

Highly reactive calcium (7.58 mmol) was added to a solution containing p-bromopolystyrene (5.08 mmol Br, based on 2.44 mmol Br/g) in THF (30 mL) and stirred for 18 hours at 0° C. The calcium-substituted reagent was allowed to settle for 1 hour at 0° C. and approximately one-half of the filtrate was removed from the polymer. The polymer was then isolated using Schlenk glassware at room temperature and washed with THF (3×, 25 mL), and dried under vacuum at room temperature for 24 hours. Yield=1.6955 g of a dark brown powder. Anal. Found: Ca=3.78, Br=5.09.

Calcium-Substituted Reagent From Chloromethylated Polystyrene

Highly reactive calcium (4.59 mmol) was added to a solution containing chloromethylated polystyrene (3.18 mmol Cl, based on 1.06 mmol Cl/g) in THF (30 mL) and stirred for 6 hours at 0° C. The calcium-substituted reagent was allowed to settle for 1 hour at 0° C. About one-half of the filtrate was removed from the polymer by cannulation. The polymer was then isolated using Schlenk glassware at room temperature and washed with THF (5×, 25 mL). The polymer was then dried under vacuum at room temperature for 12 hours. Yield=3.0307 g of a purple-red powder. Anal. Found: Ca=2.53, Cl=1.34.

Calcium Cuprate Reagent From p-Bromopolystyrene

Highly reactive calcium (2.10 mmol) was added to a solution containing p-bromopolystyrene (1.41 mmol Br, based on 2.44 mmol Br/g) in THF (30 mL) and stirred for 48 hours at room temperature. The polymer was filtered using Schlenk glassware, and fresh THF (30 mL) was added. The solution was cooled to −45° C. at which time CuCN (1.40 mmol) and LiBr (2.83 mmol) in THF (10 mL) were added. The resulting solution was stirred at −45° C. for 2 hours. The polymer was filtered at −45° C. with slight warming. THF (15 mL) was added. Approximately one-half of the solution was transferred to another flask under argon. The polymer was allowed to settle at room temperature. The filtrate was then removed via cannula. The polymer was dried under vacuum for 6 hours at room temperature. Yield=0.1595 g of a dark brown/black powder. Anal. Found: C=77.35, H=6.90, Cu=7.85, N=0.52, Br=1.10, Ca=0.20 (detection limit is 0.20%).

Calcium Cuprate Reagent From Chloromethylated Polystyrene

Highly reactive calcium (1.77 mmol) was added to a solution containing chloromethylated polystyrene (1.14 mmol Cl, based on 1.06 mmol Cl/g) in THF (30 mL) and stirred for 6 hours at 0° C. The polymer was filtered using Schlenk glassware. Fresh THF (30 mL) was then added. The solution was cooled to −45° C. at which time CuCN (1.18 mmol) and LiBr (2.83 mmol) in THF (10 mL) were added. The resulting solution was stirred at −45° C. for 2 hours. The polymer was then filtered at −45° C. with slight warming to room temperature using Schlenk glassware. THF (15 mL) was added. Approximately one-half of the solution was transferred to another flask already under argon. The polymer was allowed to settle at room temperature, and the filtrate was removed from the polymer by cannula. The polymer was dried under vacuum for 8 hours at room temperature. Yield=0.5034 g of a dark brown/black powder. Anal. Found: C=82.78, H=7.60, Cu=3.76, N=0.45, Cl=0.27, Ca=0.20 (detection limit is 0.20%).

EXAMPLE 10

Formation of a Polymer-Bound Complex of a Highly Reactive Zerovalent Calcium Species Highly reactive calcium (1.50 equivalents, based on starting bromide) prepared by the lithium biphenylide reduction of $CaI_2$ (Example 1), was added to a solution containing p-bromopolystyrene (1.00 equivalent) in THF and stirred for 72 hours at room temperature. A solution containing excess iodobenzene (<2.0 equivalents) and 5 mol-% $Pd(PPh_3)_4$ in THF was added to the resultant calcium-substituted polymer. The mixture was stirred for 2 hours at −20° C., 24 hours at room temperature, and finally refluxed for an additional 72 hours. Workup yielded a brown powder. The FTIR of this brown powder showed the disappearance of the aryl bromide precursor peaks at 1408, 1072, 1010, and 718 cm$^{-1}$. In general, the peaks in the FTIR matched those known for biphenyl, indicating the presence of a polymer-bound biphenyl group.

Lithium and di-tert-butylbiphenyl (1:1.2 molar ratio) were combined in THF to form lithium di-tert-butylbiphenyl (LiDBB). The reaction conditions were analogous to those for the preparation of lithium biphenylide (Example 1), however, all the lithium was not completely consumed. A solution containing the polymer-bound biphenyl (1 equivalent) in THF was added to this solution containing 1.05 equivalents of lithium di-tert-butylbiphenyl (LiDBB) in THF using Schlenk glassware. The mixture was stirred for 3 hours at 0° C., then for 18 hours at −78° C., and finally at room temperature for 48 hours. The variation in reaction temperatures was done in an attempt to consume the previously unconsumed lithium. There were still some lithium pieces unconsumed, however, at the end of the period of room temperature stirring. At this point, the $CaBr_2$ (0.45 equivalents) in THF was added and the reaction mixture stirred for 24 hours at room temperature. Thus, a polymer-bound complex of a highly reactive zerovalent calcium species, i.e., a polymer-bound highly reactive calcium species, was formed.

The foregoing detailed description has been given for clarity of understanding only and no unnecessary limitations are to be understood therefrom. The invention is not limited to the exact details shown and described, for obvious modifications will occur to those skilled in the art.

What is claimed:

1. A calcium-substituted polymeric reagent comprising a polymer substituted with calcium atoms in a covalent interaction, wherein the calcium atoms are derived from a zerovalent calcium species comprising formally zerovalent calcium metal atoms.

2. The calcium-substituted polymeric reagent of claim 1 wherein the polymer comprises pendant aliphatic, aryl, arylalkyl, or heterocyclic groups covalently substituted with calcium atoms.

3. The calcium-substituted polymeric reagent of claim 1 wherein the polymer is a substantially organic polymer.

4. The calcium-substituted polymeric reagent of claim 1 wherein the polymer is insoluble.

5. The calcium-substituted polymeric reagent of claim 1 wherein the polymer is a polystyrene-based polymer.

6. The calcium-substituted polymeric reagent of claim 1 wherein the zerovalent calcium species is a soluble species comprising formally zerovalent calcium metal atoms and a solubilizing agent in an ethereal, polyethereal, or hydrocarbon solvent.

7. A calcium-substituted polymeric reagent prepared by the reaction of a polymer containing at least one reactive site selected from the group consisting of a halogen, cyanide, 1,3-diene, and a conjugated polyunsaturated group, and a zerovalent calcium species.

8. The calcium-substituted polymeric reagent of claim 7 wherein the zerovalent calcium species is a soluble species comprising formally zerovalent calcium metal atoms and a solubilizing agent in an ethereal, polyethereal, or hydrocarbon solvent.

9. The calcium-substituted polymer of claim 7 wherein the polymer is a polystyrene-based polymer.

10. A zerovalent calcium species comprising a polymer having pendant biphenyl groups complexed with zerovalent calcium metal atoms.

11. The insoluble zerovalent calcium species of claim 10 wherein the polymer is insoluble in hydrocarbon, ethereal, or polyethereal solvents.

12. A polymer-bound biphenyl complex of a zerovalent calcium species prepared by the method of combining a polymer having pendant biphenyl groups with a Ca(II) salt in the presence of a reducing agent having a reduction potential of about −2.0 volts or more negative relative to SCE.

13. The polymer-bound biphenyl complex of claim 12 wherein the reducing agent is an alkali metal reducing agent.

14. The polymer-bound biphenyl complex of claim 13 wherein the alkali metal reducing agent is an alkali metal arene.

15. A calcium-substituted polymeric reagent prepared by combining a polymer with a zerovalent calcium species; wherein the polymer contains at least one reactive site selected from the group consisting of a halogen, cyanide, 1,3-diene, and conjugated polyunsaturated group, and the zerovalent calcium species comprises formally zerovalent calcium and metal atoms.

16. The calcium-substituted polymeric reagent of claim 15 wherein the zerovalent calcium species is formed from the reduction of a calcium(II) salt in an ethereal, polyethereal, or hydrocarbon solvent.

17. The calcium-substituted polymeric reagent of claim 16 wherein reduction of the calcium(II) salt is carried out using a solubilized reducing agent having a reduction potential of −1.5 volts or more negative relative to SCE.

18. The calcium-substituted polymeric reagent of claim 18 wherein the reducing agent is an alkali metal arene.

19. A polymer-bound biphenyl complex of a zerovalent calcium species prepared by combining a polymer having pendant biphenyl groups with a Ca(II) salt in the presence of a reducing agent having a reduction potential of −2.0 volts or more negative relative to SCE.

20. The polymeric-bound biphenyl complex of claim 19 wherein the polymer having pendant biphenyl groups is prepared by:

(a) combining a polymer having pendant phenyl groups with a zerovalent calcium species to form a calcium-substituted polymeric reagent; and (b) combining a phenyl halide with the calcium-substituted polymeric reagent in the presence of an effective amount of a Pd(0) catalyst to form a polymer having pendant biphenyl groups.

* * * * *

UNITED STATES PATENT AND TRADEMARK OFFICE
CERTIFICATE OF CORRECTION

PATENT NO. : 5,330,687

DATED : July 19, 1994

INVENTOR(S) : Rueben D. Ricke

It is certified that error appears in the above-indentified patent and that said Letters Patent is hereby corrected as shown below:

At Column 8, line 55, please delete "solyates" in both instances and insert therefor --solvates-- and at line 56, please delete "solyates" and insert therefor --solvates--.

At Column 15, line 42, please delete "Pd(dPPP)$_2$" and insert therefor --Pd(dppp)$_2$--.

At Column 21, line 19, please delete "131.0359" and insert therefor --131.0859-- and at line 68, please delete " 1492 cm-" and insert therefor --1492 cm$^{-1}$--.

At Column 22, line 41, please delete "1027 cm-" and insert therefor --1027 cm$^{-1}$--.

At Column 25, line 5, please delete "5503" and insert therefor --0.5503--.

At Column 29, line 34 and 35, please delete "3 68" and insert therefor --3.68--.

At Column 35, line 41, please delete "145°" and insert therefor --45°--.

Signed and Sealed this

Twenty-ninth Day of August, 1995

Attest:

BRUCE LEHMAN

*Attesting Officer*  *Commissioner of Patents and Trademarks*